DEVICE AND PROCESS FOR TWISTING AND SPINNING

Original Filed Jan. 29, 1947 14 Sheets-Sheet 1

Inventor
Eugene C. Gwaltney-DECEASED
by Roberts, Cushman & Grover
Att'ys.

DEVICE AND PROCESS FOR TWISTING AND SPINNING

Original Filed Jan. 29, 1947 14 Sheets-Sheet 2

Inventor
Eugene C. Gwaltney DECEASED
By Pobert, Cushman & Grover
Att'ys.

DEVICE AND PROCESS FOR TWISTING AND SPINNING

Original Filed Jan. 29, 1947 14 Sheets-Sheet 3

Inventor
Eugene C. Gwaltney DECEASED
by Roberts, Cushman & Grover
Att'ys.

DEVICE AND PROCESS FOR TWISTING AND SPINNING

Original Filed Jan. 29, 1947 14 Sheets-Sheet 4

Inventor
Eugene C. Gwaltney DECEASED
By Roberts, Cushman & Grover
Att'ys.

DEVICE AND PROCESS FOR TWISTING AND SPINNING

Original Filed Jan. 29, 1947 14 Sheets-Sheet 5

Inventor
Eugene C. Gwaltney DECEASED
by Roberts, Cushman & Grover
Att'ys.

DEVICE AND PROCESS FOR TWISTING AND SPINNING

Original Filed Jan. 29, 1947 14 Sheets-Sheet 6

Inventor
Eugene C. Gwaltney DECEASED
by Roberts, Cushman & Grover
Att'ys.

DEVICE AND PROCESS FOR TWISTING AND SPINNING

Original Filed Jan. 29, 1947 14 Sheets-Sheet 7

Inventor
Eugene C. Gwaltney DECEASED
By Roberts, Cushman & Grover
Att'ys.

DEVICE AND PROCESS FOR TWISTING AND SPINNING

Original Filed Jan. 29, 1947 14 Sheets-Sheet 8

Inventor
Eugene C. Gwaltney DECEASED
by Roberts, Cushman & Grover
Att'ys.

DEVICE AND PROCESS FOR TWISTING AND SPINNING

Original Filed Jan. 29, 1947 14 Sheets-Sheet 9

Inventor
Eugene C. Gwaltney DECEASED
by Roberts, Cushman & Grover
Att'ys.

DEVICE AND PROCESS FOR TWISTING AND SPINNING

Original Filed Jan. 29, 1947 14 Sheets-Sheet 10

Inventor
Eugene C. Gwaltney DECEASED
By Pobert, Cushman & Grover
Att'ys.

DEVICE AND PROCESS FOR TWISTING AND SPINNING

Original Filed Jan. 29, 1947 14 Sheets-Sheet 11

Inventor
Eugene C. Gwaltney DECEASE
By Roberts, Cushman & Grover
Attys.

DEVICE AND PROCESS FOR TWISTING AND SPINNING

Original Filed Jan. 29, 1947 14 Sheets-Sheet 12

Inventor
Eugene C. Gwaltney DECEASED
By Roberts, Cushman & Grover
Att'ys.

DEVICE AND PROCESS FOR TWISTING AND SPINNING

Original Filed Jan. 29, 1947 14 Sheets-Sheet 13

Inventor
Eugene C. Gwaltney DECEASED
By Roberts, Cushman & Grover
Att'ys.

DEVICE AND PROCESS FOR TWISTING AND SPINNING

Original Filed Jan. 29, 1947 14 Sheets-Sheet 14

Inventor
Eugene C. Gwaltney DECEASED
by Roberts, Cushman & Grover
Att'ys.

Reissued July 22, 1952

Re. 23,525

UNITED STATES PATENT OFFICE 23,525

DEVICE AND PROCESS FOR TWISTING AND SPINNING

Eugene C. Gwaltney, deceased, late of Biddeford Pool, Maine, by Saco-Lowell Shops, assignee, Boston, Mass.

Original No. 2,473,520, dated June 21, 1949, Serial No. 724,987, January 29, 1947. Application for reissue February 21, 1952, Serial No. 272,742

30 Claims. (Cl. 57—75)

Matter enclosed in heavy brackets [ ] appears in the original patent but forms no part of this reissue specification; matter printed in italics indicates the additions made by reissue.

This invention relates to device and process for twisting and spinning, in which a thread under tension is twisted by being given a circular motion of several thousand revolutions a minute, between an apex and a generator of a figure of revolution such as a flier, cap or traveler.

It is well known in the art and long accepted as inevitable that both the commercial construction and the operating speed of usual twisting or spinning machines are closely dependent upon the particular thread to be handled. It is self-evident that it would be much cheaper and generally more satisfactory for a manufacturer of textile machinery to be able to make all of its machinery of a given type identical in construction, and it would be even more advantageous for textile mills to have a single construction of machine that could operate economically and at the same speed upon all counts of thread. Nevertheless, this desirable condition seems impossible with the forms of machines heretofore developed. For instance, the assignee of this invention has long found it to be commercially necessary to make its ring spinning machines intended for 20's cotton with one gauge, those intended for 30's cotton with another gauge, and those intended for 40's cotton with still another gauge. A great variety of speeds of operation, sizes of bobbins and sizes of spinning rings are involved in spinning threads of various counts because on conventional machinery different counts are subject to different limitations as to the conditions of spinning. Thus there have evolved many specialized designs of spinning units, each adapted for a particular count or narrow range of counts. Typical values for the ring diameter and maximum traverse which are followed in practice in the use of conventional machinery in spinning cotton warp yarn with a 4.5 twist multiplier are tabulated below. These values arise in part from necessity for minimizing breakage of the yarn and in part from necessity for avoiding excessive wear upon the traveler.

| Count | Ring Diameter In Inches | Traverse In Inches | Weight of Yarn on Warp-Wound Bobbin in Ounces |
|---|---|---|---|
| 6's | 3 | 9 | 10.25 |
| 20's | 2 | 8 | 3.84 |
| 30's | 1⅞ | 8 | 3.33 |
| 60's | 1⅝ | 7 | 2.07 |

The applicant's assignee has recently revised its published tables which show typical values for ring diameter and traverse in conventional ring spinning, so as to show the somewhat larger values for ring diameter and traverse that are tabulated below, these being here accompanied by a typical resulting weight of yarn on the bobbin.

| Count | Ring Diameter In Inches | Traverse In Inches | Weight of Yarn on Warp-Wound Bobbin in Ounces |
|---|---|---|---|
| 6's | 3 | 9 | 10.25 |
| 20's | 2¼ | 8½ | 5.31 |
| 30's | 1⅞ | 8½ | 3.60 |
| 60's | 1¾ | 7½ | 2.63 |

The values given in the above tables are exceeded in some practices, and also, under favorable conditions in the applicant's assignee's present recommendations for new installations of conventional spinning, particularly as to counts in the region of 20's and coarser.

Certain commercial practices that have exceeded the above values are as follows: spinning 30's yarn, from staple fibers, using 2¼ inch rings and 9⅛ inch traverse, producing 5 ounces of such yarn on the package; spinning 13's yarn, using 3 inch rings and 9 inch traverse (that is, the ring diameter and traverse given above for 6's); spinning 20's yarn, using 2½ inch rings and 9 inch traverse, producing 7.33 ounces of yarn on a package; spinning 7's, 8's and 10's using 3½ inch rings and 9 inch traverse, with an estimated weight of yarn on the package of about 12 or 13 ounces.

Thus in the medium and finer counts of yarn, which constitute the greatest volume of spun yarn, the package size is conventionally not over about 7 ounces, and usually less. Larger packages are produced when coarse yarn such as 6's is spun, but here relatively low spindle speeds are ordinarily employed, greatly below the range of speeds employed with the medium and finer counts. Increase in both the size of packages and the spindle speed would be desirable in the case of coarse yarns. Great increase in the size of packages of medium and finer counts would be necessary in order to produce a machine which could economically be used for the whole range of counts from 6's to 60's.

An important general object of the invention is to increase the effectiveness of twisting operations, particularly by overcoming previous limitations upon such factors as speed, size of thread package and suitability for various counts of thread, all with the result of providing for efficiently handling a wide variety of material on a single construction of machine, and so reducing the need for a variety of different and special constructions of machines.

A related general object is to increase materially the size of the package, and so reduce materially the cost of initial production of the yarn and of later treatment and use of the yarn. The larger the package, the less the number of bobbins used and the less the number of bobbin-doffing operations required in spinning a given quantity of yarn. Similarly, the larger the package, the less the number of bobbins that must be handled, and the less the number of knots that must be tied in later operations such as rewinding.

The invention not only aims to avoid previous limitations on the size of the spinning package, but also to produce a more nearly equal tension and less thread breakage, in the spinning of packages of increased size, than has previously been possible in the spinning of conventional packages.

Efforts to increase the size of packages in conventional machines are in large measure blocked by the fact that in these conventional machines the travelers would quickly wear out if they were run in excess of customary linear speed. Thus, if a traveler on a two inch ring is running near its permissible maximum linear speed (generally deemed to be about 5000 feet per minute for that size ring), it would be ordinarily disadvantageous to change the ring size to 3 inches and maintain the same spindle speed, because under the changed conditions the linear speed of the traveler would be one-half greater, would greatly exceed the permissible maximum linear speed and the traveler would quickly wear out.

Moreover, inevitable variation in the tension limits the size of the package, particularly its height, in conventional machines. As a conventional balloon is lengthened and shortened in traversing the yarn upon the package, the tension upon the spinning yarn is increased by the increase in the air drag when the balloon is lengthened and decreased by the decrease in air drag when the balloon is shortened. Accordingly, if the balloon is equipped with the proper weight of traveler for its shorter length, the traveler will be too heavy for the yarn when the balloon is lengthened beyond a certain length, or if the balloon is equipped with the proper weight of traveler for its longest length, then the traveler will be too light when the balloon is shortened by more than a certain amount. Thus, the permissible height of traverse and hence the height of the spinning package is limited to a distance in which the traveler can adequately take care of both the longest and shortest balloon. As indicated above, this results in a maximum length of traverse of not more than about 7½ inches for some of the finer counts, and actually, in practice, many of the finer counts are spun with a traverse as short as 5 or 6 inches.

It is possible to construct mechanism for twisting a given material in which the figure of revolution assumed by the thread can be made self-limiting as to diameter. In this form the figure of revolution acquires and itself tends to maintain one or more exteriorly concave reduced-diameter necks between the guide eye and a spinning ring that establishes the base of the figure of revolution of the thread and although the rotating thread bulges outwardly above and below each such neck, the maximum diameter of the figure of revolution is apparently held in check by the conditions therein which accompany the production of such self-induced neck. The production of these necks is described in the book "Studies of Quality in Cotton" by W. Lawrence Balls, published by Macmillan & Co. Limited, in London, 1928, from page 103 to page 107 inclusive, and at pages 173 and 182.

Such naturally necked form has not gone into any extensive use. A number of difficult complications are encountered in employment of such naturally necked figure of revolution.

The diameter of a self-induced neck is always substantially smaller than the path of a generator such as a traveler that defines the base of the figure of revolution, and a self-induced neck extends through a substantial height and is exteriorly concave (inwardly convex) so that the mere presence of this neck is a distinct limitation upon the size and shape of any thread package that is to be located wholly or partly within the figure of revolution of the thread. If the machine, as is usual in ring spinning machines, were intended to have clearance between the bobbin and the thread approaching the traveler, the shape of this figure of revolution would constitute a limitation as to both height and ultimate diameter of the bobbin.

A naturally necked figure of revolution is essentially unstable. The levels at which such necks occur are functions of several factors which include not only tension and resistance of the thread to movement through the air, but also the speed of revolution of the thread and the height of the figure of revolution. Normally, variations in any of these factors tend to alter the position and eventually the number of the neck or necks.

If a traversing ring-rail is employed, rise and fall of the traversing ring-rail continually changes the level of the neck or necks in a naturally necked figure of revolution, and unless such traverse is restricted to a relatively short length, not only the level but also the number of self-induced necks is changed during traversing of the ring-rail. This constitutes a further limitation upon the space available for a thread package within a naturally necked figure of revolution in the case of a machine of the traversing ring-rail type.

Changes in the level and number of self-induced necks are also caused by variation in tension in the thread as the winding package builds up, thus still further tending to reduce the space available for the thread package within the figure of revolution, unless on the other hand the thread package is kept so small that variation in tension is very slight during the building up of the package.

When a heavier or lighter portion of thread enters the figure of revolution, as happens with great frequency in spinning cotton, any naturally induced neck or necks in the figure of revolution can be observed to shift up or down and the shapes of the portions above and below such neck can be observed to change.

Any of the above-described alterations in level of a naturally induced neck or alterations in number of naturally induced necks are apt to be accompanied by marked change in the path of the thread adjacent to the generator, for instance, a traveler, at the base of the figure of revolution, whereas it is desirable on the other hand to maintain such a path approximately constant. Changes in the path of the thread are particularly marked in case the number of naturally induced necks increases or decreases, because during such change in number of necks there is a rapid snapping of a portion of revolving thread back and forth between an outwardly concave outline and an outwardly convex outline.

Ring spinning machines have rings and travelers that are designed to accommodate thread going to the traveler in a particular path, and complications, such as rapid wear of the traveler, or undue tension or breakage of the thread, are liable to ensue if the thread runs to the traveler in a markedly different path from that which the ring and traveler normally accommodate.

The instability of the naturally-necked figure or revolution is particularly objectionable when it is attempted to employ this figure in the spinning of carded cotton yarn, more especially the medium or coarse counts. The instability of the figure is increased by the inevitable continual variation in diameter of such yarn, amounting to three or four hundred percent. This same variation of diameter in carded yarn makes the yarn particularly subject to breakage when a momentarily high tension in the unstable figure of revolution reacts upon a thin place in the yarn. In fact, many of my attempts to spin medium and coarse counts of carded yarn by the use of a naturally necked figure of revolution have resulted in breakage of the thread before the shape of the figure of revolution could be properly observed.

Various objects and advantages of the invention will be apparent from this specification and its drawings wherein the invention is explained by way of example by the illustration and description of its application to ring spinning.

The present invention involves the discovery that if conventional ring spinning practice for a given count of thread be altered merely by increasing the length of the figure of revolution so as to create a naturally-necked figure of revolution instead of the usual balloon, the size of the package cannot satisfactorily be materially enlarged, but that if in addition to such lengthening, the extent of outward concavity of the outline of the resulting figure be reduced by the application of inwardly directed stabilizing force, *at a plurality of levels simultaneously*, as by contact with [an] encircling [element or] elements such as [a ring or] rings, then the package can be very substantially enlarged both in diameter and in height. Such enlargement in diameter involves corresponding enlargement of path of the traveler but no departure from its conventional manner of threading with the usual open bend of the thread, and permits a substantial increase in its speed beyond usual conventional limits of traveler speed.

The concavity-reducing effect of the inwardly directed stabilizing force does not appear necessarily to require any great amount of reduction in cross section of the figure of revolution at the place of application [because in many instances sufficient concavity-reducing effect can be secured if an encircling ring makes contact with the figure of revolution]. On the other hand, an appreciable degree of local compression of the figure of revolution will usually be employed in order that the inwardly directed force may be certainly applied to the samewhat unstable figure of revolution without the necessity for much accuracy in positioning and proportioning the constricting means. In some cases the cross section of the figure of revolution may be substantially decreased at the place of application of the inwardly directed force for the purpose of increasing the extent to which the modified figure of revolution is caused to bow outwardly between the level of application of this force and the generator of the figure of revolution.

One advantage of the natural necked figure of revolution is that each naturally enlarged or bulging portion of the figure appears to exercise a restraint upon the size of the other enlarged or bulging portion or portions of the figure, and it is desired to preserve in the modified figure of revolution this advantage of the natural necked figure of revolution. Accordingly, the means such as a ring employed to apply the inwardly directed force to the figure of revolution *at any given place* is preferably arranged so as to leave the figure of revolution of twisting threads free to partake of circular motion and bulge outwardly in the region between such ring and the apex of the figure of revolution and thus aid in the control of the portion of the figure between such ring and the generator.

[The initial formation of a necked figure of revolution depends upon the resultant of several factors. Increase in height of the figure of revolution, increase in angular velocity, and increase in linear mass density of the thread all tend toward establishment of the first natural neck or toward increase in the number of natural necks. Increase in the tension of the thread tends to reduce the number of necks or eliminate them altogether. A natural freely rotating necked figure of revolution is a delicately balanced system, the shape of each portion being dependent upon the shape of every other portion, and the whole figure is probably in a condition of equilibrium in which the potential energy of the system is at a minimum for the conditions under which the thread momentarily is rotating. This equilibrium is extremely unstable due to these conditions changing.]

An exact explanation of the theory of action of the inwardly directed force in reducing exterior concavity is not known. In any event, it is readily observable that the rotating and circularly moving thread reacts to an inward force both by resisting this force and also by shifting from an exteriorly concave outline to an outwardly convex outline, particularly and in the first instance in the region below the level of application of the inward force.

In the drawings:

Figs. 1A to 3E, inclusive, are diagrams representing an effort to employ a naturally necked figure of revolution of thread by increasing, beyond conventional practice, the distance between a spinning ring and an apex for the spinning thread, these several views representing successive stages in the building of the spinning package.

Figs. 4A to 6E, inclusive, are diagrams corresponding to the respective stages of Figs. 1A to 3E, and show the figure of revolution as altered by use of the present invention.

Fig. 7 is a front elevation, on a smaller scale than the diagrams, and shows a portion of a ring spinning machine for carrying on the operation of Figs. 4A to 6E, only one of the many spinning units of the machine being shown.

Figs. 8A to 10C, inclusive, are diagrams showing the practice of the invention with a wide range of counts of thread, Figs. 8A to 8C illustrating the spinning of No. 6's thread, Figs. 9A to 9C illustrating the spinning of No. 30's thread, and Figs. 10A to 10C illustrating the spinning of No. 60's thread.

Figs. 11A to 11C are diagrams similar to Figs.

8A to 8C, illustrating the spinning of No. 6's thread with a modified adjustment of apparatus.

In Figs. 8A to 11C the size of the yarn package is very much larger than previously deemed practical for medium and fine counts and the spindle speed is very much higher than previously deemed practical for coarse counts.

Figs. 12A to 12C inclusive are diagrams representing an effort to employ a naturally necked figure of revolution of No. 20's thread with a considerably larger spinning ring and a considerably taller bobbin than the figure of revolution of Figs. 1A to 3E.

[Figs. 13A to 13C inclusive are diagrams showing alteration of the figure of revolution of Figs. 12A to 12C by means of a ring.]

[Figs. 14A to 14C inclusive are diagrams showing alteration of the figure of revolution of Figs. 13A to 13C by means of a further ring; and]

*Figs. 13A to 13C inclusive are diagrams showing a modification of the natural figure of revolution of Figs. 12A to 12C by two rings, one of small diameter and the other of relatively large diameter; and*

Figs. [15A to 15C] *14A to 14C* inclusive are diagrams showing an apparatus and operation similar to those of Figs. [14A to 14C] *13A to 13C* but employing additional rings.

In each of the diagrams shown in the drawings, the level of the spindle rail is indicated at 53 and horizontal lines show various levels above this, up to and including the level of the apex of the figure of revolution of the thread. The heights of these levels, expressed in inches, are given in figures at the left of each sheet of these diagrams. Thus the dimensions of the particular constructions shown can be read from the drawings. These diagrams as they appear in the original Patent Office drawings, are one-third size.

Figs. 1A to 3E inclusive are diagrams representing an effort to employ a naturally-necked figure of revolution in the spinning of 20's yarn (which is generally considered to be the coarsest of the medium counts), to employ a 2¼ inch ring, which is as large as many rings usually employed in spinning 20's, and to operate at a spindle speed of 9,600 R. P. M., which is substantially faster than is usually employed with 2¼ inch rings.

In the several figures of the drawings, the subscripts I, II and III are employed to identify the outlines of the figure of revolution and the momentary location of control rings with the corresponding momentary position of the spinning ring and stage of winding.

The ring rail was traversed to produce the usual warp wind. Thus Figs. 1A to 1F inclusive show six different levels $G_I$ of the spinning ring during the stage in which the bobbin B is substantially empty. Figs. 2A to 2F inclusive show six different levels $G_{II}$ of the spinning ring during the half-full bobbin stage. Figs. 3A to 3E inclusive show five different levels $G_{III}$ of the spinning ring during the full bobbin stage.

In each of Figs. 1A to 3E, the curves $N_I$, $N_{II}$, or $N_{III}$ indicate one side of the outline of the natural figure of revolution corresponding respectively to the level $G_I$, $G_{II}$, or $G_{III}$ of the spinning ring and traveler diagrammatically indicated in that figure.

It was determined experimentally that a No. 5—0 traveler was best suited to running of the apparatus under the foregoing conditions represented by Figs. 1A to 3E inclusive, and this traveler was accordingly used.

Generally unsatisfactory results were secured in the operation represented diagrammatically by Figs. 1A to 3E. The figure of revolution was shown unstable and although its outline is shown diagrammatically by lines in these drawings, in reality the figure of revolution was rapidly fluctuating in outline, particularly at the stages represented by Figs. 1A, 1B and 3A to 3E inclusive.

The diagrams of Figs. 1A to 3E inclusive are therefore in the nature of illustrative examples of momentary positions of the fluctuating figure of revolution.

It may be observed that a neck appears in the outline at about the 7½ inch level in Fig. 1A, and that this neck has no counterpart in the outline of Figs. 1B to 1F, these latter figures each having only one neck while the figure of revolution of Fig. 1A has two necks.

Figs. 3A to 3E inclusive show a variation between one and three necks during winding on the full bobbin. Figs. 3E and 3D each show a single neck. Figs. 3C and 3B each show a second slight neck. Fig. 3A shows two additional slight necks, making three in all.

It is evident that insufficient clearance is provided between the fluctuating figure of revolution and the winding package, especially in Figs. 2A, 3A and 3B. Frequent break-down of the thread occurred while the observations of Figs. 1A to 3E were being made due to rapid changes in tension in the unstable figure of revolution and also actual contact of the figure of revolution with the winding package.

It might have been possible to improve this condition somewhat by shortening the traverse, say 1½ inches from the bottom, since this in effect would have eliminated the positions of Figs. 1A, 2A, 2B, 3A and 3B. This would, however, have directly reduced the size of the package. In addition, if the traverse were so shortened, and another different count of yarn was spun, particularly unstable conditions and particularly poor clearances would have been likely to occur at other different levels or stages from those in which they occurred in Figs. 1A to 3B, and so not be avoided by this possible shortening of the traverse.

Finally, Figs. 1A to 3E show undesirable abrupt changes of angle of approach of the thread to the traveler. This is most noticeable in comparing the outlines of the figures of revolution of Figs. 2C and 2D. A condition such as this is deemed undesirable as harmfully affecting the life of the traveler.

Figs. 4A to 4F, 5A to 5F, 6A to 6E, which correspond, respectively, to Figs. 1A to 1F, 2A to 2F and 3A to 3E, and which employ the same spindle speed, size of spinning ring, count of thread and weight of traveler, show provisions whereby the figures of revolution of Figs. 1A to 3E are modified and stabilized. As indicated above, this modification and stabilization preferably involve use of a ring to apply inwardly-directed force to the figure of revolution.

A ring arranged to constrict the naturally necked figure of revolution between the base and the apex performs the function of suppressing formation of a naturally induced neck in a portion of the figure extending down from the ring toward the base of the figure.

The largest diameter portion of the uppermost enlargement of the figure of revolution varies from about the 22 inch level of Fig. 1A to about the 24 inch level of Fig. 3A, and the neck next below this varies somewhat similarly from about the 17 inch level of Fig. 1A to about the 20 inch level of Fig. 3A. Quite possibly, greater variation in these levels occurred momentarily as the figure fluctuated. Application of an encircling ring 71, Figs. 4A to 6E, to the figure of revolution prevents this naturally induced neck from forming within a zone of substantial height next below this ring. In a sense the ring may be regarded as acting to displace downwardly, away from the apex, a region of potential neck formation. A ring sufficiently near to the base of the figure would preclude the formation of a natural neck between the ring and the base. As employed in Figs. 4A to 6E, the ring 71 is located above a naturally concave portion of the figure of revolution which it is desired to stabilize in an exteriorly convex outline, and at least no higher than the general region of the uppermost enlargement of the figure of revolution.

In the embodiment of Figs. 4A to 6E, a plurality of rings are employed. Ring 71, as indicated, precludes natural neck formation through a substantial distance below it. A further ring 70, acting in the region in which natural neck formation is precluded by ring 71, in turn precludes natural neck formation through a substantial distance below such further ring 70. A final ring 35, acting in the region in which natural neck formation is precluded by ring 70, in turn precludes natural neck formation through the region extending from such final ring 35 to the base of the figure of revolution.

As indicated in Figs. 4A to 6E, the figure of revolution between ring 35 and the traveler is stabilized in an outwardly convex but relatively flat outline which adequately clears the spinning package.

Although Figs. 4A to 6E involve the successive actions and cooperation of a series of rings in suppressing all natural neck-formation throughout the height of the figure of revolution, in the broader aspects of the invention it is not essential to suppress natural neck formation either at all times during the building of the package or in all parts of the figure of revolution at a given time. [For instance, a ring 35 acting to suppress natural neck formation between itself and the base of the figure may be sufficient for some purposes.] Certain advantages [,however,] may be secured by suppressing all natural neck formation as in Figs. 4A to 6E, among which advantages there is the advantage of preventing any portion of the figure from changing its outline from outwardly concave to outwardly convex and vice versa, i. e., snapping in and out during the changing conditions encountered as the spinning progresses.

As indicated above and as shown in Figs. 1A to 3E, natural necks would occur [in] *at* varying levels even for a given count of thread and further variation would result if a different count were spun. The successive actions of a plurality of rings are helpful here in insuring that at the level of a given ring, for instance ring 35, the diameter of the figure of revolution is not smaller than the diameter of this ring. Thus, for example ring 70 may be regarded not only as suppressing natural neck formation in a zone below it, but also as causing the figure of revolution at ring 35 to be large enough to run in contact with and be acted on by ring 35.

It will be understood that the pattern of natural neck formation varies not only with the count of thread but also with the speed and tension under which the spinning is conducted. The several rings 71, 70 and 35, Figs. 4A to 7, are present in somewhat greater number than might be necessary if only some one count of thread were to be spun under some one set of conditions as to tension and speed. Thus, it is quite possible, for some particular count and some particular set of operating conditions, that rings 70 and 71, for example, might satisfactorily be replaced by a single ring.

Fig. 7 shows on a smaller scale than Figs. 4A to 6E a single spindle of the spinning frame and mechanism for raising and lowering the ring rail and the several rings 71, 70, 35, in synchronism.

One of the many spinning rings 50 of the machine is shown as mounted on the usual traversing ring rail 51, and a bobbin B is shown as mounted on a suitable spindle within the spinning ring 50 and driven by conventional spindle-driving means indicated generally at 52 mounted on a stationary spindle rail 53. The ring 50 of Fig. 7, its stroke and progression of traverse by means of the ring rail 51, the distance from the spindle rail to the nip of the front top and bottom rollers 54 and 55 of the spinning machine, and the dimensions and speed of the bobbin B are all the same as those of Figs. 1A to 6E, inclusive.

A longitudinally reciprocating bar 56 is operated by a usual form of builder motion mechanism. A suitable connection between the reciprocating bar 56 and the ring rail 51 may for example include a bell crank 58 pivotally mounted on the frame of the machine at 59 and having its upper arm connected to be moved by the reciprocating bar 56, and provided on its lower arm with a roller 60 engageable with a tappet 61 at the bottom of a lifter rod 62 which is connected to the ring rail 51. The connection between the bell crank arm 58 and reciprocating bar 56 may for instance be such that the reciprocating bar moves the bell crank in a counterclockwise direction, and the usual adjustable balance weight may be employed to cause the return movement of the bell crank 58 and lifter rod 62.

The final means for applying inwardly directed force, namely, the ring 35, is preferably mounted upon a rail 65 which is vertically movable by a lifter rod 66 on the lower end of which a tappet 66A is engageable by a roller 67 rotatably mounted on the bell crank lever 58 between the roller 60 which actuates the ring rail 51 and the pivot 59 of the bell crank lever. Accordingly, the rail 65 and the ring 35 move generally in accordance with the motion of the ring rail 51 but only a fraction of the distance moved by the ring rail, for example, about 35%.

The preliminary means for applying inwardly directed force, namely, the two additional rings 70 and 71, are preferably mounted respectively on rails 72 and 73 which are vertically movable by a lifter rod 75 on the lower end of which a tappet 76 is engageable by a roller 77 rotatably mounted on the bell crank 58 between the roller 67 and the pivot 59. Accordingly, the rails 72 and 73 and the additional rings 70 and 71 move generally in accordance with the motion of the final ring 35 but only a fraction of the distance moved by ring 35, for example about 45%.

The device of Figs. 4A to 7 is especially constructed with a view to utilizing the circular motion of the thread as a substitute for traveler-induced tension and for most effective use of the portion of the figure of revolution above the ring 35 to control the extent of outward bowing of the outline of the portion of the figure below the ring 35. Thus, when employing the plurality of rings shown, these are each of a considerable diameter which represents a substantial proportion of the diameter of the spinning ring 50. When the spinning ring 50 has a diameter of 2¼ inches as shown, the ring 35 preferably has an internal diameter of 1⅜ inches, the ring 70 preferably has an internal diameter of 1⅛ inches, and the ring 71 preferably has an internal diameter of 1 inch.

The substantial diameter of ring 35 also aids in defining a shape of the lower part of the figure of revolution which adapts this part adequately to clear the spinning package.

It will be evident that the example of the invention of Figs. 4A to 6E accomplishes the successful modification of a naturally necked figure of revolution to permit it to operate under conditions under which it could not successfully operate in its natural state of Figs. 1A to 3E. Moreover, as indicated above, the operation of Figs. 4A to 6E successfully employed in the spinning of 20's yarn a 2¼ inch spinning ring, which is as large as many rings that are usually employed in spinning 20's yarn, and a spindle speed of 9,600 R. P. M., which is faster than spindle speeds usually employed in machines having 2¼ inch spinning rings. A material increase in size of yarn package is produced by the use of the apparatus of Figs. 4A to 6E in the spinning of fine counts.

The apparatus of Figs. 4A to 6E can be operated at faster spindle speeds than 9,600 R. P. M., and this was experimentally done at 12,500 R. P. M., and at 14,000 R. P. M. using various counts of yarn and travelers appropriate thereto.

Further embodiments of the invention will show how the invention enables both the ring diameter and length of traverse to be very materially increased, particularly above the limits of ring diameter and length of traverse previously applicable to the medium and finer counts, and will show how a wide range of counts can be spun onto a very large package.

Figs. 8A to 10C inclusive show use of the invention in connection with a traversing motion of the ring rail 51 which produces the so-called combination wind, although the invention can be employed when the traversing motion is such as to produce a filling wind, a warp wind (as in Figs. 4A to 6E), an inverted warp wind or various other patterns of winding. The machine can have lifting and lowering mechanism similar to that of Fig. 7, the mechanism, not shown, which reciprocates the rod 56 having a motion such as to traverse the ring rail 51 for combination wind, and the other rails 65, 72 and 73 moving proportionately and in synchronism with the ring rail in a manner generally similar to Figs. 4A to 6E. In winding a bobbin with a combination wind, the ring rail has a traversing stroke having a length equal to a large proportion of the length of the thread mass ultimately to be wound, for instance about two-thirds, three-fourths or four-fifths. With the bobbin empty, the ring rail starts at a position near the bottom of the bobbin and takes successive strokes up and down a large portion of the length of the bobbin. Simultaneously, the ring rail is given an additional progressive movement upwardly until its upper limit of movement reaches a point near the top of the bobbin.

For instance in Figs. 8A to 8C the stroke of traverse of the spinning ring 50 is from the level $G_I$ of Fig. 8A to the level of $G_I$ of Fig. 8C at the beginning of winding, from the level $G_{II}$ of Fig. 8A to the level $G_{II}$ of Fig. 8C when the bobbin is about half full, and from the level $G_{III}$ of Fig. 8A to the level $G_{III}$ of Fig. 8C at the finish of winding. Figs. 8A, 8B and 8C show respectively three bottom levels, three mid levels, and three top levels of the stroke of the traversing spinning ring 50.

In each of Figs. 8A to 10C inclusive, the curves $M_I$, $M_{II}$ and $M_{III}$ each indicate a side of the outline of the modified and stabilized figure of revolution corresponding respectively to the levels $G_I$, $G_{II}$ and $G_{III}$ of the spinning ring. To prevent confusion between the several curves, curves $M_I$ and $M_{III}$ (for the empty bobbin stage and the full bobbin stage) are placed on the left and show the left side of the figure of revolution, and curves $M_{II}$ (for the half-full bobbin stage) are placed on the right and show the right side of the figure of revolution.

Figs. 8A, and 8B and 8C diagrammatically show the outlines of modified and stabilized figures of revolution of 6's cotton produced by this invention, employing a No. 10 traveler (weight 2.6 grains).

In the interests of standardizing the equipment to be used for a wide range of counts in the operations of Figs. 8A to 10C, a spindle speed of 9,000 R. P. M. was employed. This speed is less than the maximum that could be employed but was selected in order that the power cost of rotating the very large wound packages would be sufficiently small and would not significantly offset the saving which accrues through the production of such large packages. This speed of 9,000 R. P. M. is somewhat less than some speeds conventionally employed in spinning medium and fine counts (onto much smaller packages than produced in Figs. 8A to 10C). However this speed of 9,000 R. P. M. is very materially greater than speeds conventionally employed in spinning the coarsest counts such as 6's. Thus, though selected from the standpoint of standardization and the standpoint of economy of power, this speed of 9,000 R. P. M. represents a very desirable increase in speed of spinning such coarse counts as 6's.

The spinning ring used in Figs. 8A to 10C has a diameter of 3 inches which is very much larger than the diameter of rings conventionally used for any but the coarsest counts. At the spindle speed of 9,000 R. P. M. employed, the traveler speed was approximately 7,068 feet per minute. Conventional tables showing traveler speeds for various spinning ring diameters and spindle speeds do not give any figure for traveler speed corresponding to a three inch ring and a spindle speed of 9,000 R. P. M., nor do they suggest any possibility of use of a traveler speed as high as 7,000 feet per minute or even 6,500 feet per minute for any combination of ring diameter and spindle speed.

Figures 8A, 8B, 8C:
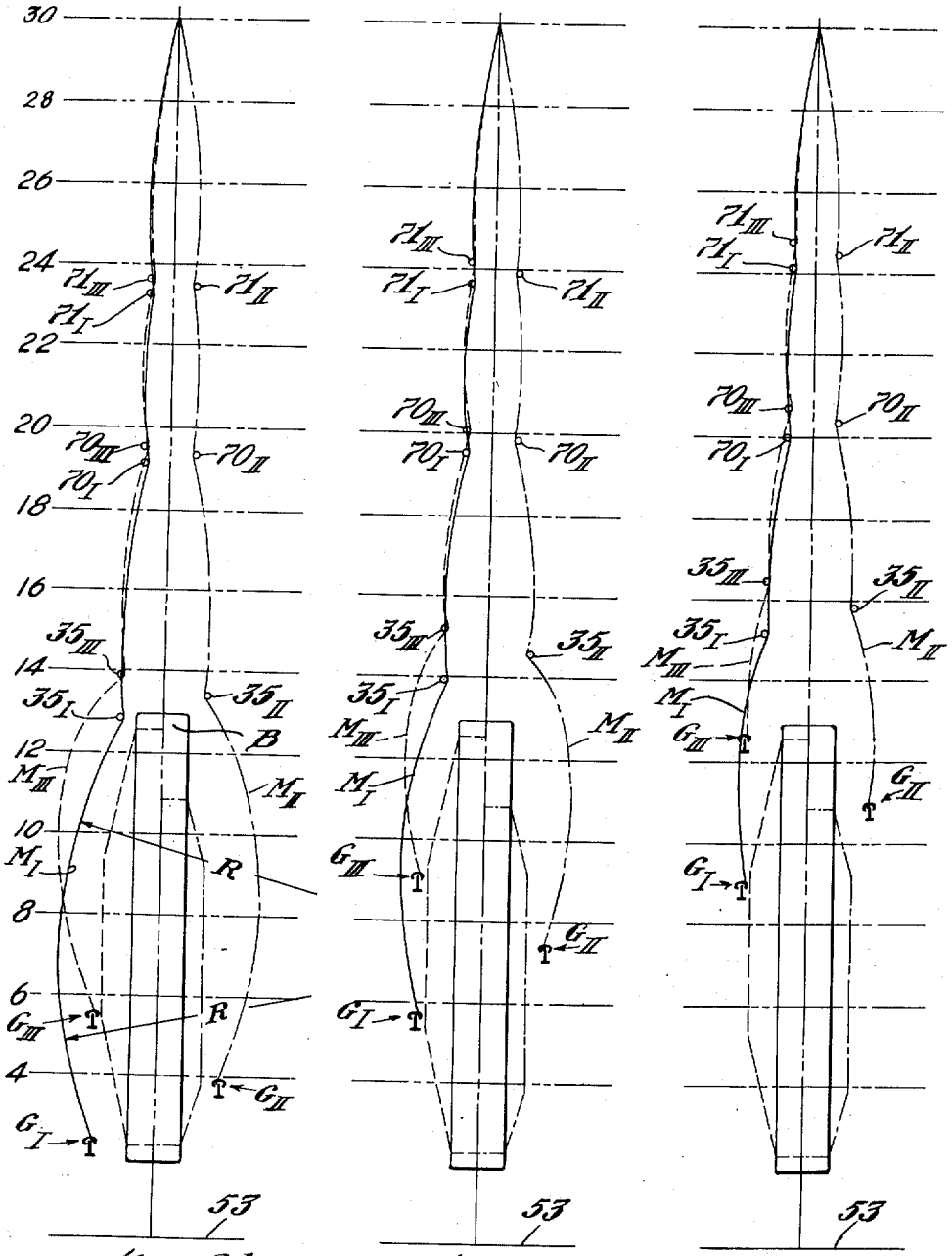

Figs. 8A, 8B and 8C show how, for a given count, the angle of approach of the spinning thread to the traveler was maintained fairly constant throughout the spinning of the whole package, avoiding any abrupt variation in this angle. This result is advantageous in promoting longer life of the travelers. Figs. 9A, 9B and 9C and Figs. 10A, 10B and 10C show an even more uniform approach of the thread in the spinning of medium and finer counts.

It will be observed from Figs. 8A to 10C that the shapes of the stabilized figures of revolution for 6's, 30's and 60's yarns were all surprisingly similar although the weight of the traveler was the only factor that was changed in compensation for the wide differences in count. The close similarity of the stabilized figures of revolution permits the same spinning frame to be used advantageously for the whole range of counts. The successful spinning of a wide range of counts of threads onto large bobbins with identical equipment and operating conditions excepting for selection of the traveler, as now rendered possible by this invention, is deemed to be of great potential advantage both to operators of textile mills and to manufacturers of spinning machinery. Thus, spinning frames, instead of being made in a wide variety of gauges and proportioned for a wide variety of sizes of spinning rings and bobbins, as heretofore necessary, can now be produced to a single specification adapted to operate efficiently upon all counts of thread within a wide range.

Although different weights of travelers were used in connection with the widely different counts, and the weight of the traveler affects the shape of the figure of revolution to some extent, the desired shape of the figure of revolution can be secured with a much wider range of traveler weights in the practice of the present invention than in conventional spinning where a critical relation exists between the shape of the balloon and the weight of the traveler. For instance, in the spinning of No. 30's yarn according to Figs. 9A, 9B and 9C, a No. 13—0 traveler (weight 0.4 grain) was found to give the best results, as will be explained below. However, satisfactory shapes of the figures of revolution were secured in spinning No. 30's yarn with travelers ranging from No. 5—0 (weight 0.65 grain) to No. 18—0 (weight 0.275 grain), and this last traveler in turn was the one found best for No. 60's yarn.

This wide range of travelers that yield satisfactory shapes of the figures of revolution can be taken advantage of in either of two ways:

A. A spinning mill can greatly reduce the number of travelers that it is necessary to keep in stock for spinning various counts of yarn.

B. Within a broad range of travelers that will yield the proper shapes of the figures of revolution according to the present invention, a spinner can select the weight or weights of traveler that will yield the proper balance of forces at the traveler to reduce greatly the wear upon the traveler. I have found the travelers so selected will far exceed the traveler life expected in conventional spinning.

I have not as yet attempted to determine the ideal travelers for the many counts of yarn that can be spun commercially, but the following will show the method by which proper traveler weight has been determined in a particular case. As indicated above, suitable shapes of figures of revolution were obtained in the case of No. 30's yarn with travelers ranging from No. 5—0 (weight 0.65 grain) to No. 18—0 (weight 0.275 grain). Within this range, the heaviest and lightest travelers were found to wear out relatively quickly. However, travelers just lighter than the middle of this range, that is, travelers Nos. 12—0 (weight 0.425 grain), 13—0 (weight 0.4 grain) and 14—0 (weight 0.375 grain) were found to yield a very long traveler life even at the high speed of over 7000 feet per minute, and greatly exceeded the normal expected life of travelers in conventional spinning. Travelers in conventional spinning are ordinarily expected to last 160 hours or less, running at less than 5000 feet per minute.

The most readily apparent new effect secured in the operations of Figs. 8A to 10C is the large increase in amount of yarn that is wound on the package. The package, which substantially fills the three inch spinning ring, was produced with a total traverse of 10¼ inches. A net weight of approximately 12 ounces of yarn was wound on the bobbin for each of the counts of 6's, 30's and 60's spun. As compared to previous conventional values of package size, such as noted near the beginning of this specification, this large package had nearly four times the capacity of conventional packages of 30's as more usually produced, and represented a lesser relative increase in the case of coarser counts or no increase in some instances of coarser counts, and a greater relative increase in the case of finer counts. In the case of the 30's, this increase in package capacity means that only about ¼ as many bobbin-changing operations are needed in spinning of a given quantity of yarn. Later when the yarn is taken off the bobbin in being used or rewound, another reduction in bobbin handling again results, and a corresponding decrease in knot-tying operations is secured.

While the increase in package capacity was less in the case of the coarse 6's and does not amount to an increase in capacity over some instances of conventional-type spinning, a substantial increase in speed was secured in spinning that yarn according to the present invention.

The invention may be expected to reduce greatly the cost of spinning all counts, to reduce the cost to a greater extent in the case of the ordinarily more expensive fine counts than in the case of the ordinarily cheaper coarse counts, and thus diminish the cost differential which has previously favored use of coarse yarn.

Figures 1A, 1B, 1C, 1D, 1E, 1F:
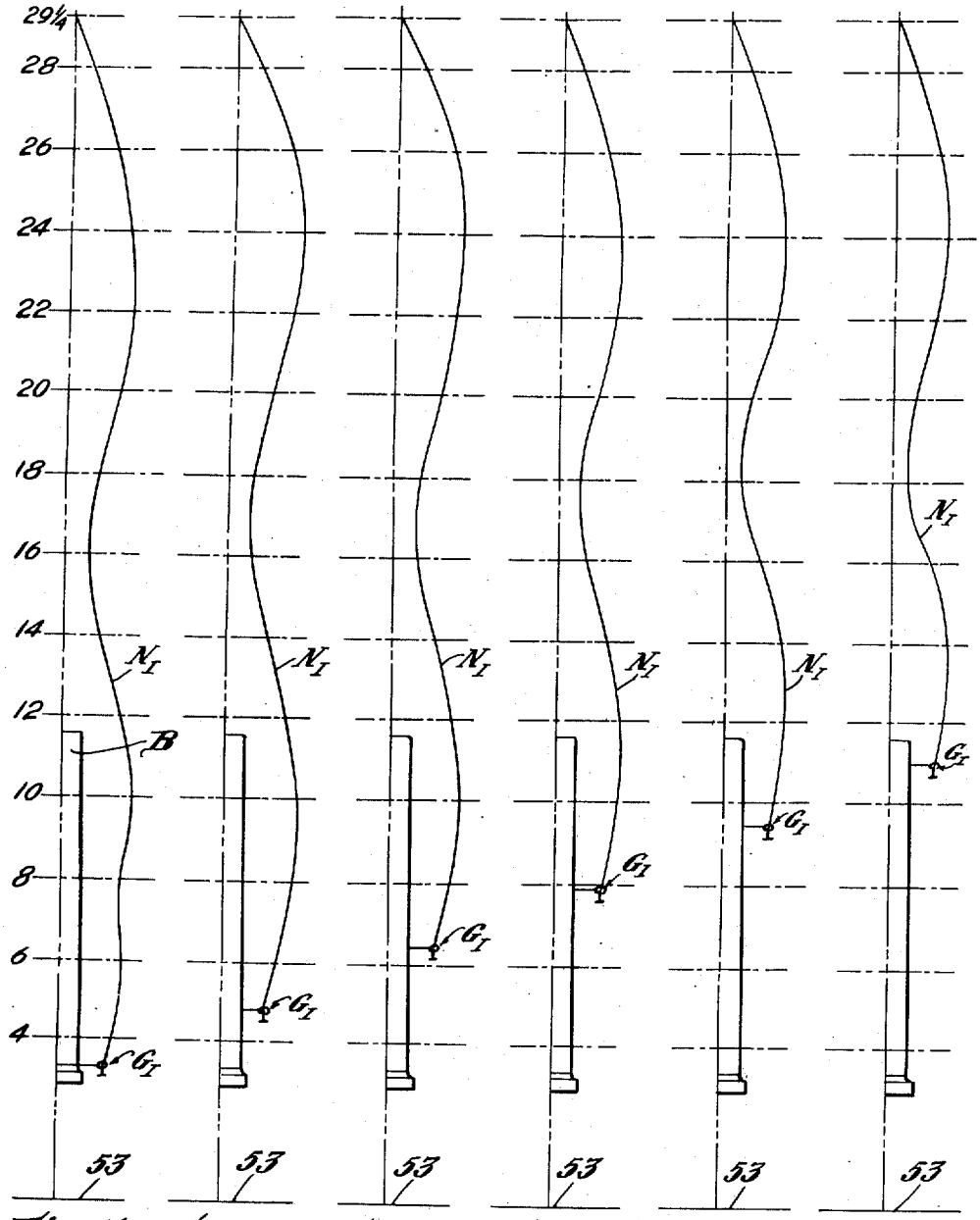
Figures 2A, 2B, 2C, 2D, 2E, 2F:
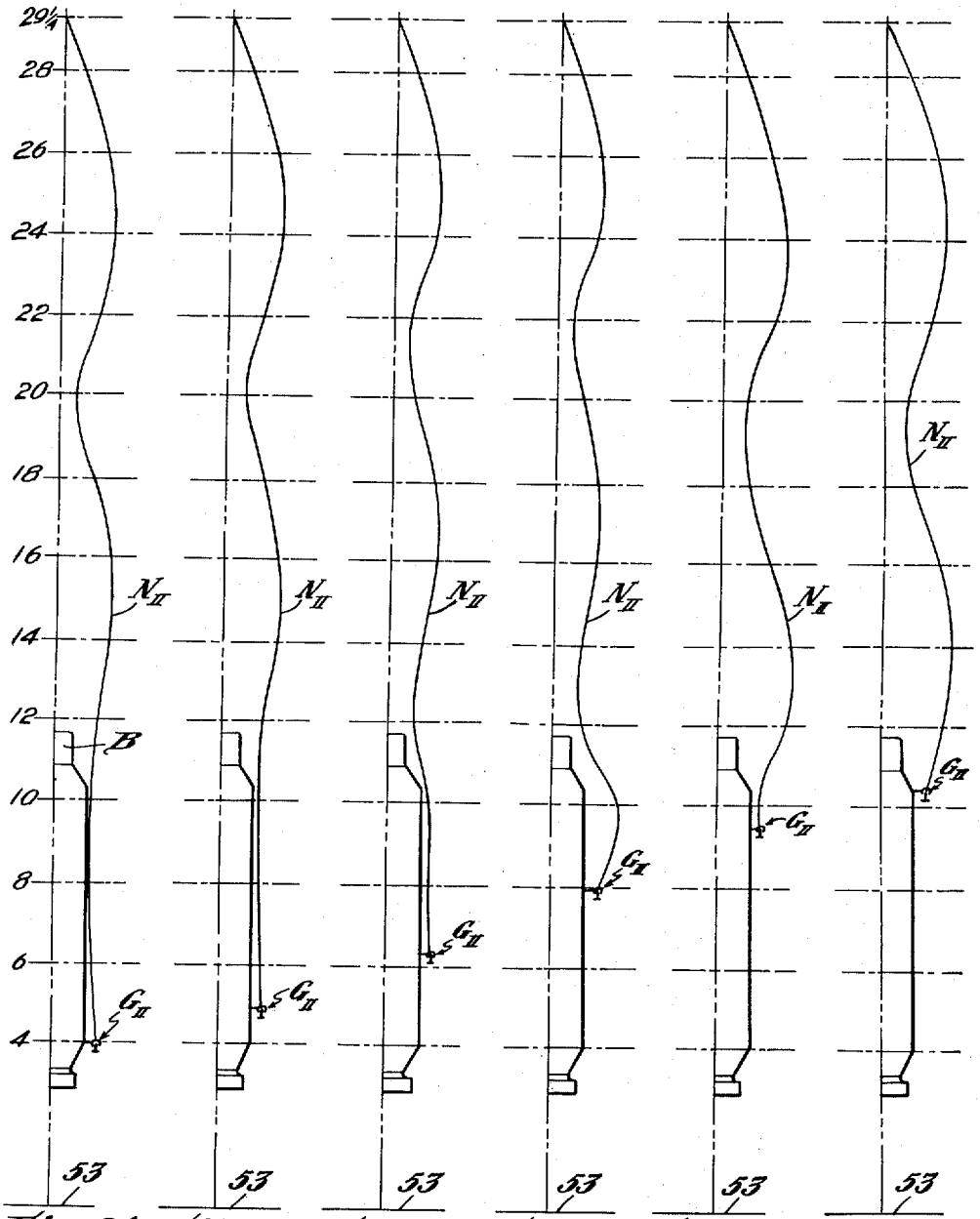
Figures 3A, 3B, 3C, 3D, 3E:
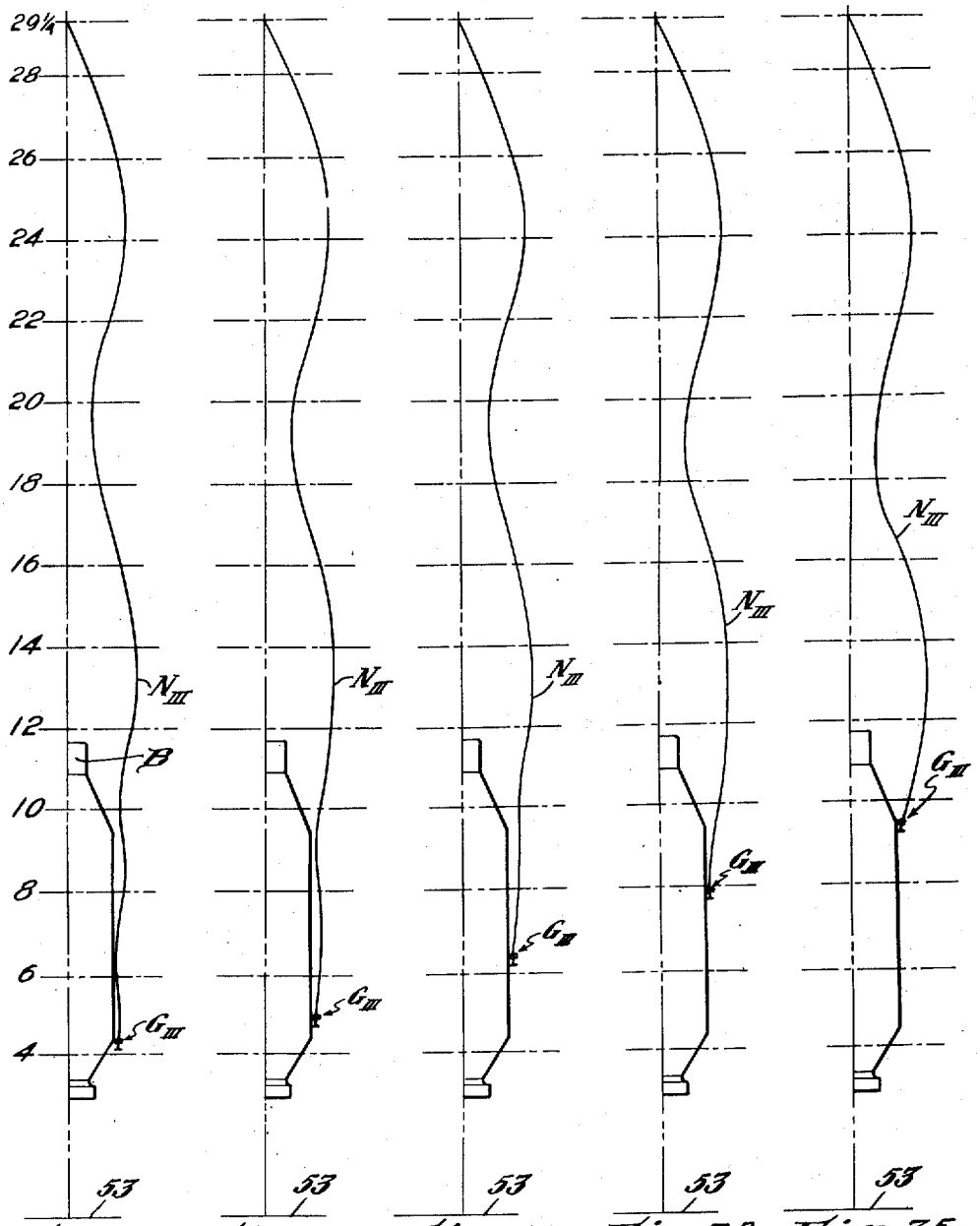
Figures 4A, 4B, 4C, 4D, 4E, 4F:
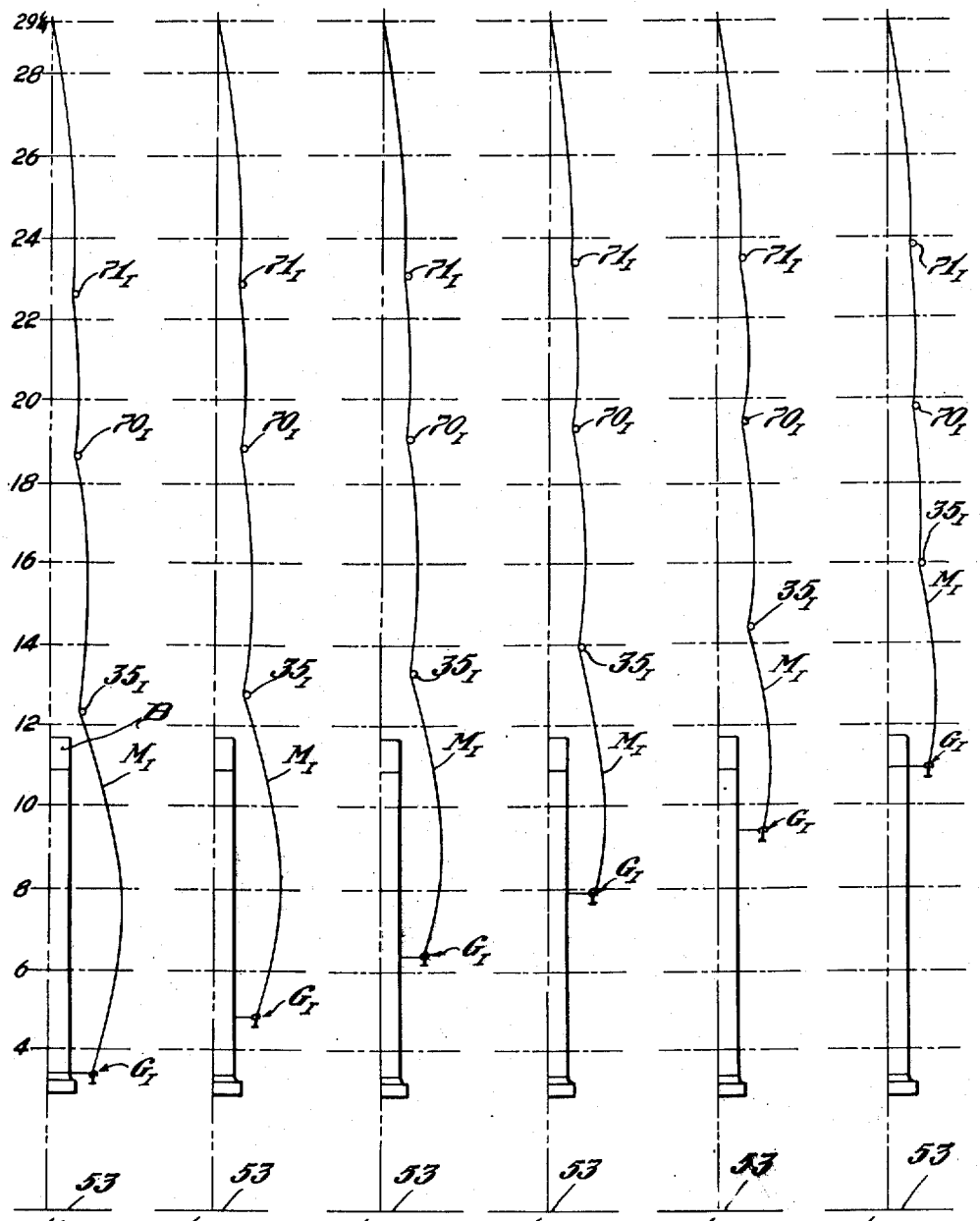
Figures 5A, 5B, 5C, 5D, 5E, 5F:
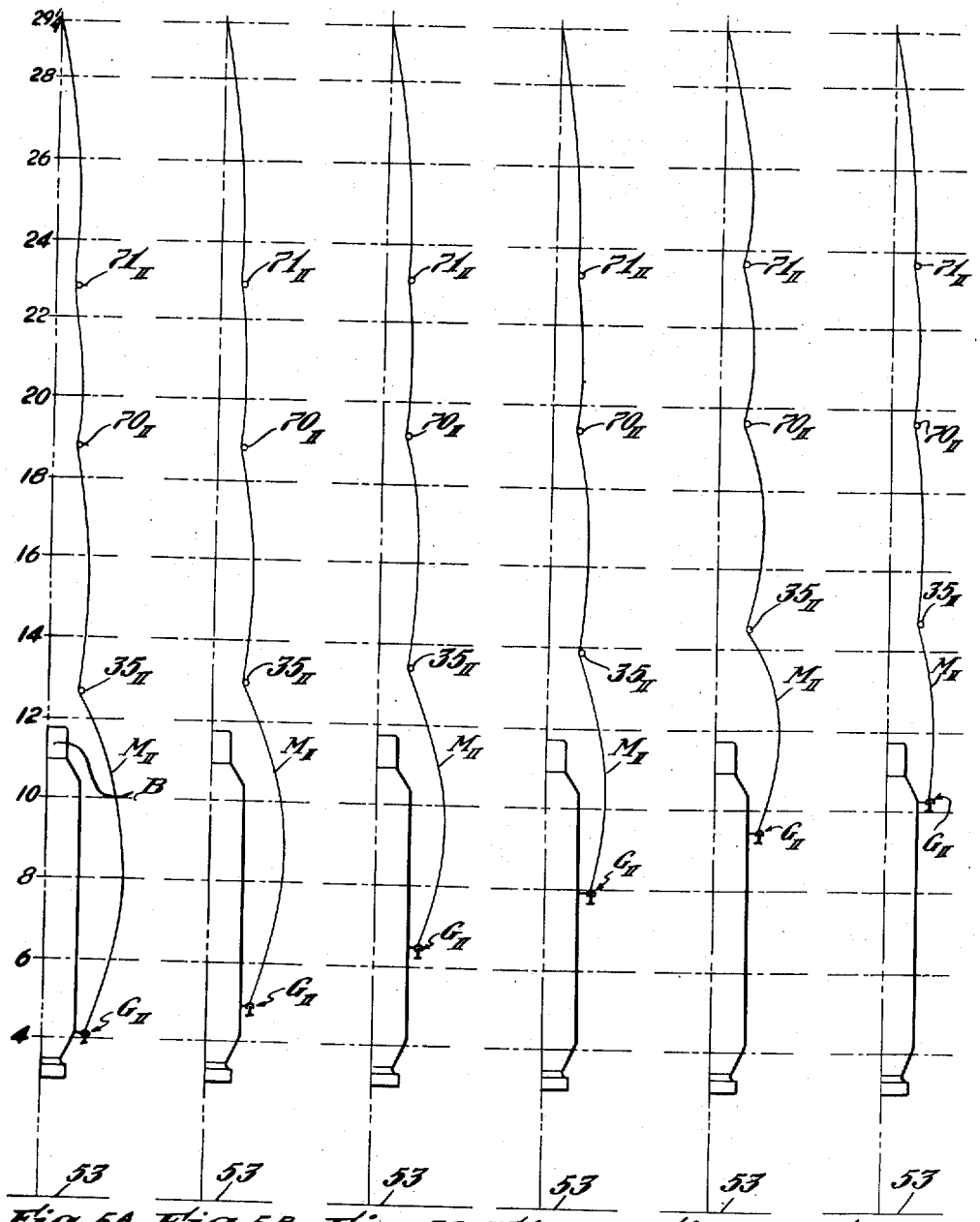
Figures 6A, 6B, 6C, 6D, 6E:
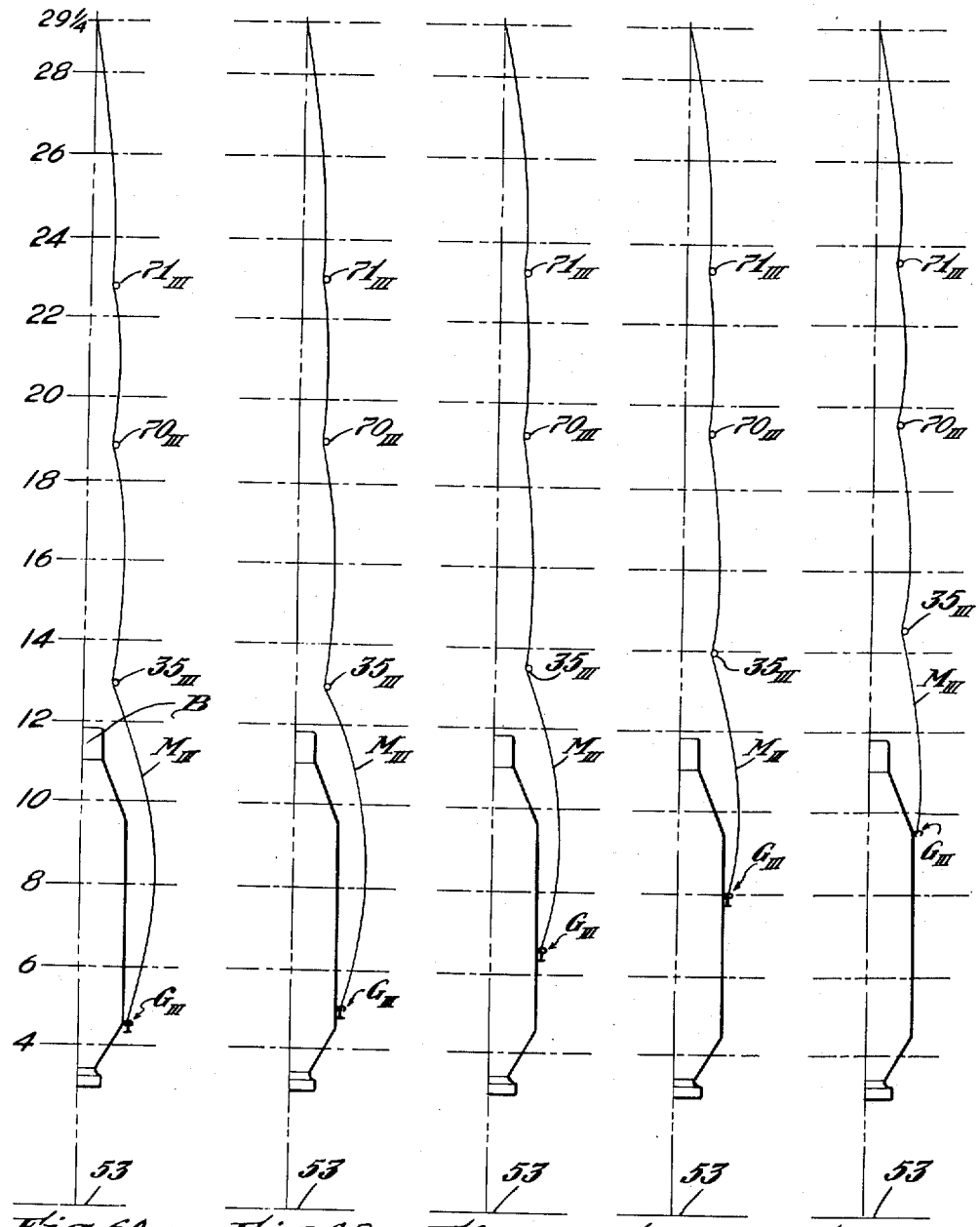
Figures 9A, 9B, 9C:
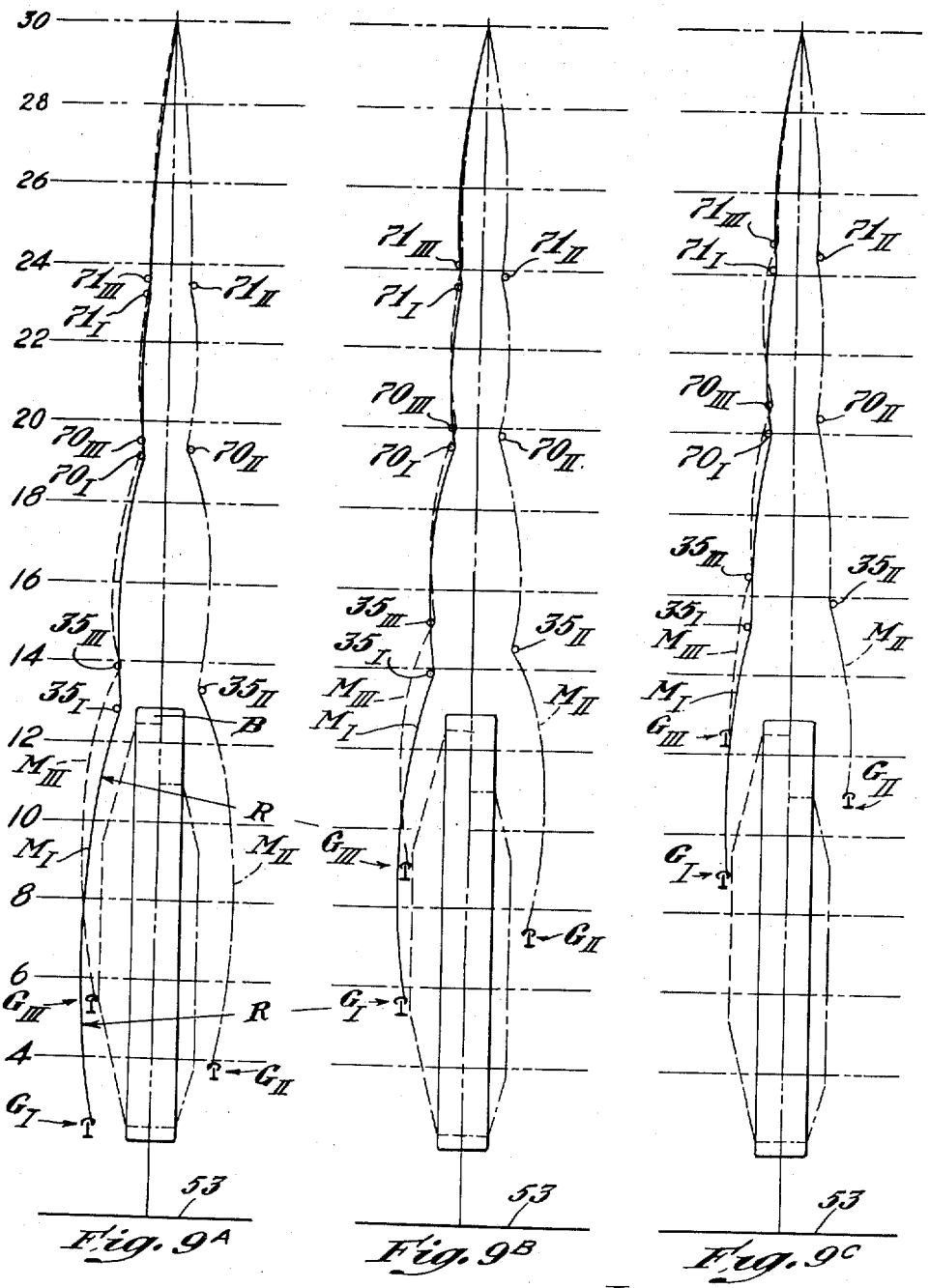
Figs. 9A, 9B and 9C are similar to Figs. 8A, 8B and 8C, and diagrammatically show the outlines of modified and stabilized figures of revolution of 30's cotton produced by this invention, employing a No. 13—0 traveler (weight 0.4 grain).
Figures 10A, 10B, 10C:
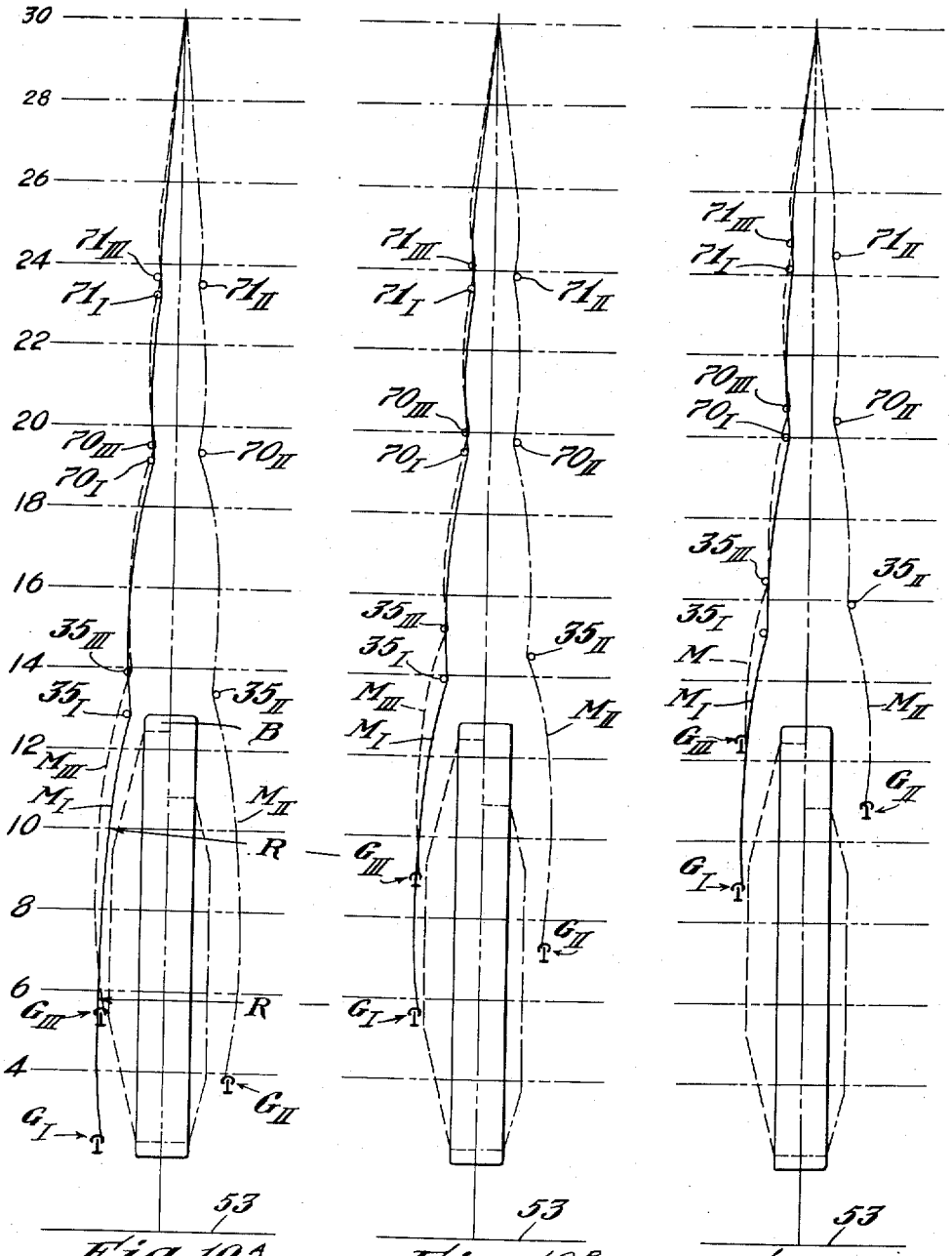
Figs. 10A, 10B and 10C are similar to Figs. 8A, 8B and 8C and diagrammatically show the outlines of modified and stabilized figures of revolution of 60's cotton produced by this invention, employing a No. 18—0 traveler (weight 0.275 grain).

For simplicity and maximum convenience of access to the bobbin and thread package at all times, the lowest level of the ring 35 may be above the top of the bobbin, as indicated in Fig. 4A, or may be at the level of the top of the bobbin, more particularly when bobbins of increased height are employed, as indicated in Figs. 8A 9A and 10A.

Figures 11A, 11B, 11C:
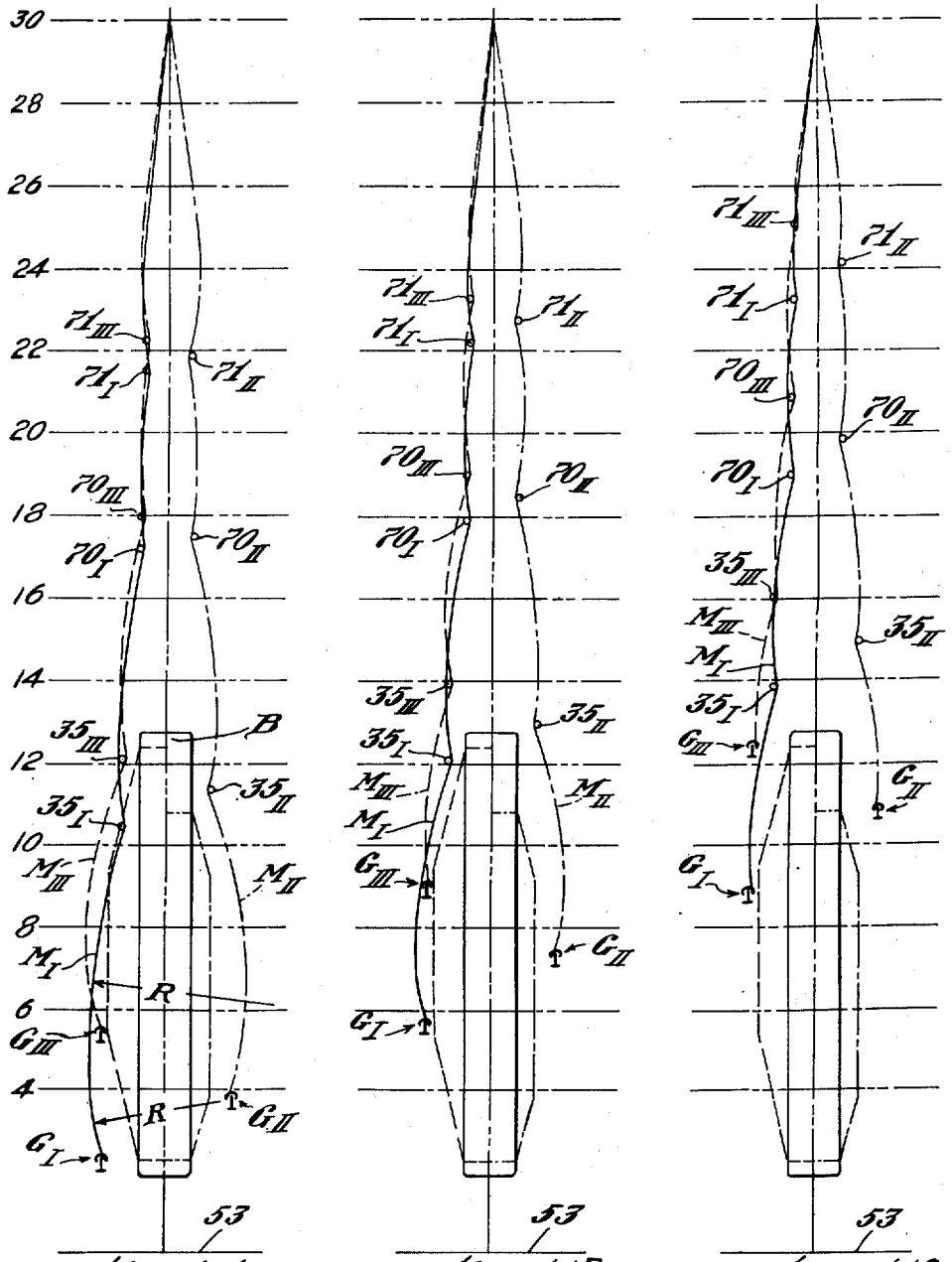

However, in a modified form of the invention shown in Figs. 11A to 11C, using the same large bobbin as in Figs. 8A to 10C, the ring 35 is lowered somewhat from its positions shown in Figs. 8A to 8C, and in the lower positions of the spinning ring the ring 35 is substantially below the top of the bobbin. Lowering the ring 35 from its positions of Figs. 8A to its positions of Fig. 11A reduces the outward bowing of the lower portion of the figure of revolution of No. 6's thread of Fig. 11A so as to cause this figure of revolution to correspond more closely to those of Nos. 30's and 60's of Figs. 9A and 10A than does the corresponding figure of revolution of No. 6's of Fig. 8A.

With the lower level of the ring 35 located substantially below the level of the top of the bobbin as in Fig. 11A, the length of vertical stroke of the ring 35 may advantageously be somewhat increased, as may be seen for instance by comparing the stroke from level 35$_{I}$ of Fig. 11A to level 35$_{III}$ of Fig. 11C with the stroke from level 35$_{I}$ of Fig. 8A to level 35$_{III}$ of Fig. 8C.

The outlines of the figures of revolution shown in each of Figs. 8A to 11C inclusive have relatively large radii R in the region between the generator and ring 35, representing a desirable flat curvature as distinguished from an excessive outward bulge.

It will be apparent that as the height of the package is increased, as rendered possible by this invention, then at the upper levels of traverse the figure of revolution is correspondingly shortened in height and the tendency toward natural neck formation is diminished.

The question arises as to how far this extension of the package in height can advantageously be carried, that is, for a given figure of revolution created when the ring rail is at the base of the package, how far is it advantageous, to extend the package upwardly within such figure of revolution.

Traveler-induced tension, as indicated above, varies with the diameter of the surface on which the yarn is being wound, and tends to be greater when this diameter is small and smaller when the full diameter of the package is reached. Traveler-induced tension therefore requires the most aid or supplement from the windage of the figure of revolution during winding on the full diameter portions of the package, and the least aid or supplement from the windage of the figure of revolution in winding on the smallest diameter portions. Therefore, in winding the reduced diameter portions at the top of a tall bobbin according to this invention, it is entirely practicable to operate with a figure of revolution which in its natural state would not form a neck at that stage of the winding, the traveler induced tension and the shortening of the figure of revolution together having the effect of suppressing such neck formation. This affords the opportunity to extend the pointed tip portion of the package farther up into the figure of revolution than would be the case if it were required that the natural figure of revolution would naturally form a neck during the winding of this pointed tip portion of the package. It is however recommended that substantially throughout the winding of the full diameter surface portions of the package the natural figure of revolution be sufficiently high to form at least one neck and a convex portion below the neck if allowed to assume its natural shape.

Figures 12A, 12B, 12C:
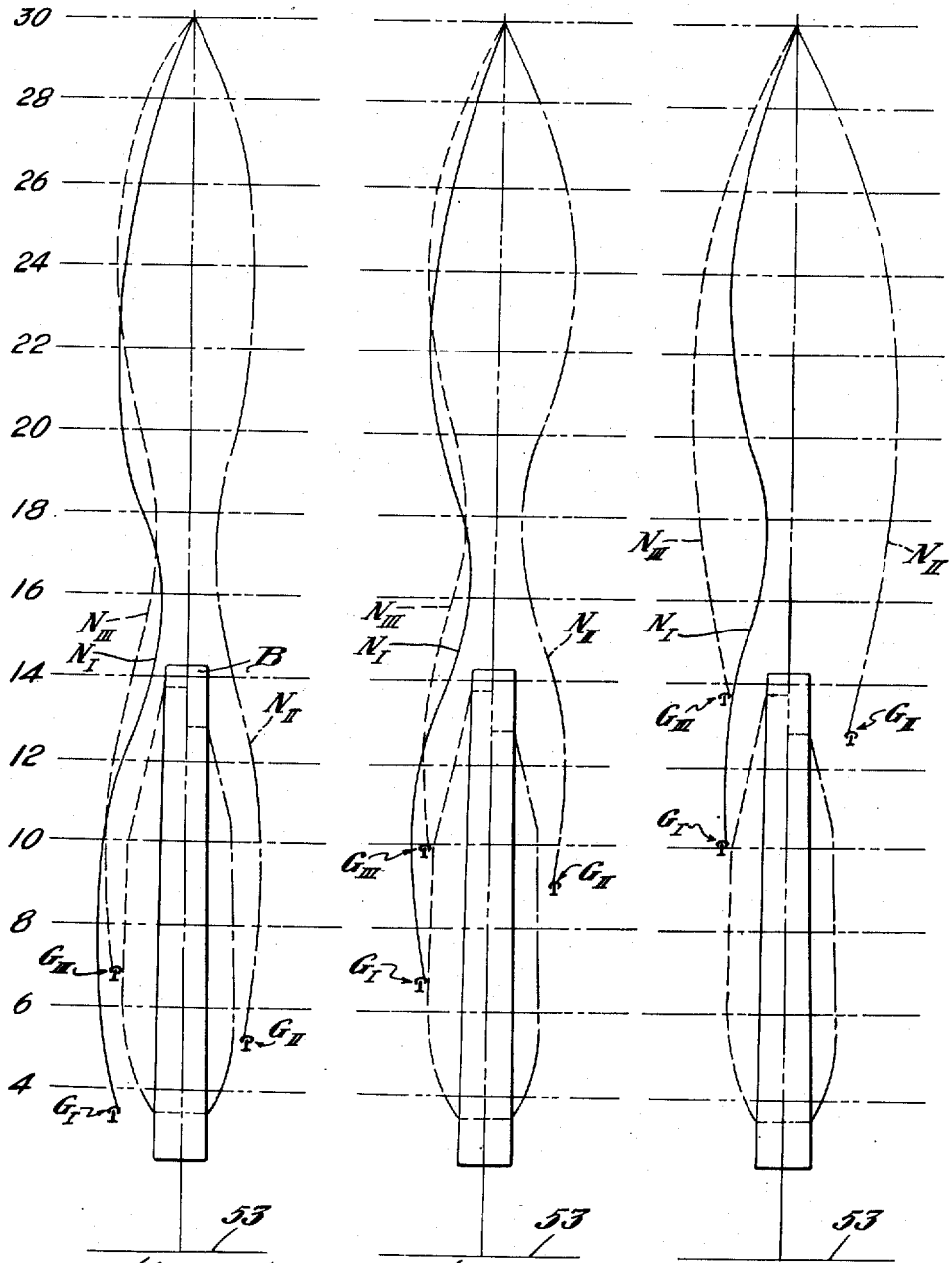

Figs. 12A to 12C inclusive diagrammatically represent an effort to employ a naturally-necked figure of revolution of No. 20's thread at a spindle speed of 9,000 R. P. M., with a spinning ring of 3 inches diameter, and a No. 1—0 traveler (weight 0.9 grain).

Figs. 12A to 12C also show how the natural figure of revolution forms a concave neck with convexly shaped portions above and below such neck at all stages of winding the full diameter portions of the package (curves $N_{III}$ of Fig. 12A and $N_{III}$ of Fig. 12B), the package being extended so far up into the figure of revolution that the figure of revolution does not naturally form a neck during the winding of some of the reduced-diameter tip portions of the package as shown in curves $N_{II}$ and $N_{III}$ of Fig. 12C.

The effort to employ the naturally necked figures of revolution of Figs. 12A to 12C was unsuccessful. Very frequent breakage of the thread occurred.

The clearance between the figure of revolution and the bobbin was frequently inadequate, having in mind the fact that the figure was unstable and fluctuating in and out from the momentary positions diagrammatically shown. The thread was under an unduly high tension, and this tension was also subject to large and abrupt changes as the shape of the figure of revolution changed.

Figure 13:
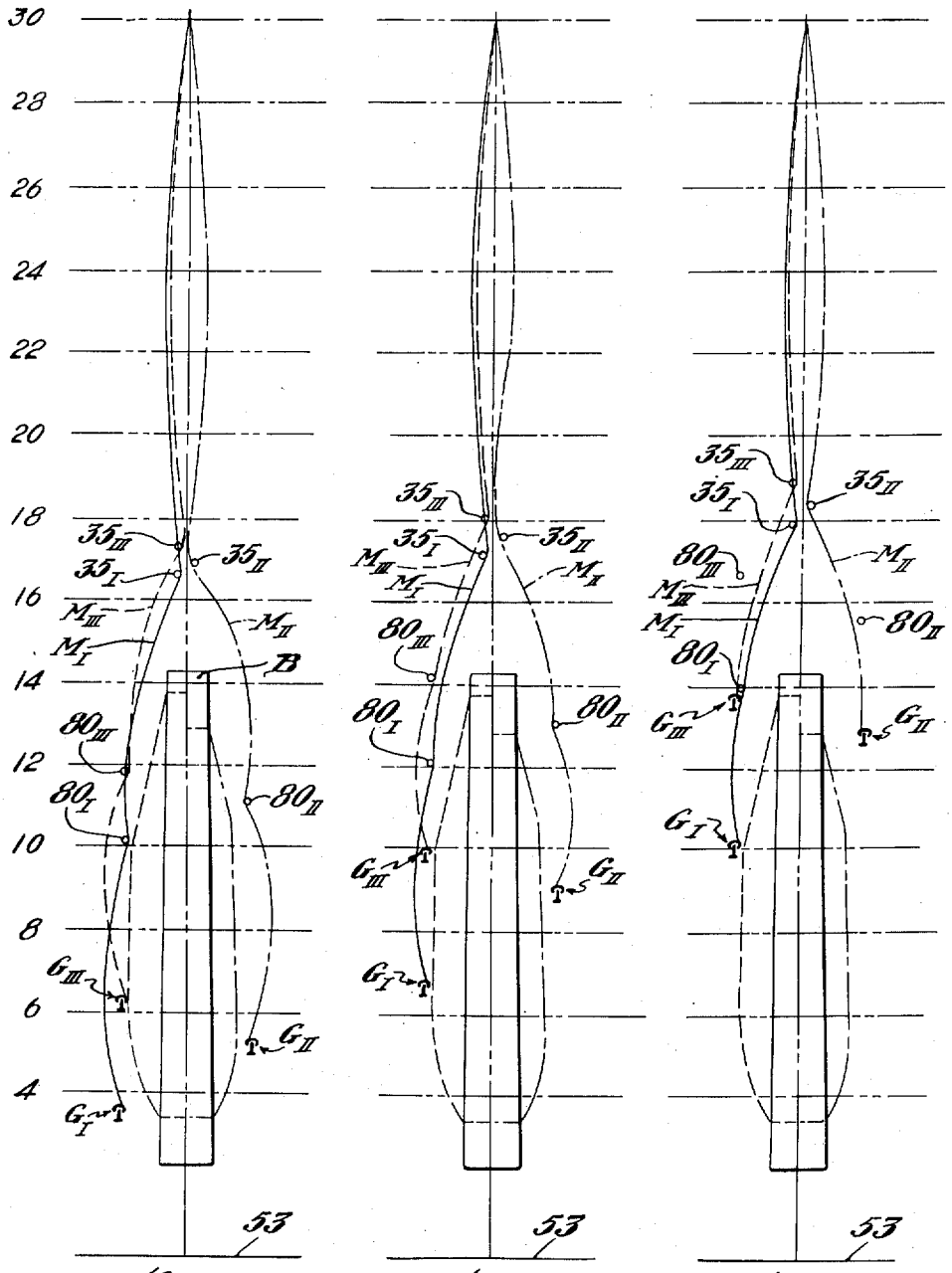

[Figs. 13A to 13C illustrate how the invention may be applied by the application to the figure of revolution of Figs. 12A to 12C of an encircling ring 35 of small diameter, applied in the region of a natural neck and at a considerable distance from the apex, without use of the intermediate rings 70 and 71.]

[As shown in Figs. 13A to 13C the ring 35 of ¼ inch internal diameter is located at approximately the position at which the neck naturally forms in the figure of revolution of Figs. 12A to 12C and]

*In Figs. 13A to 13C the natural figure of revolution of Figs. 12A to 12C is modified by a ring 35 of ¼ inch internal diameter, applied in the region in which a natural neck would form in the natural figure of revolution of Figs. 12A to 12C, and a ring 80 nearly as large as the lower part of the figure of revolution. The ring 35* is given an up and down motion in harmony with the spinning ring but only a fractional part thereof, for example about 27% of the motion of the spinning ring, for instance by lifting and lowering mechanism such as employed to lift and lower the ring 35 of Fig. 7. This motion of the ring 35 is such as to maintain it in the region where the natural neck would form in the figure of revolution in the absence of this ring 35.

[As indicated by a comparison of Figs. 12A to 12C and 13A to 13C, the outwardly concave portions of the natural figure of revolution below the level at which the ring 35 is applied are stabilized by the ring in an outwardly convex outline.]

Figures 14A, 14B, 14C:
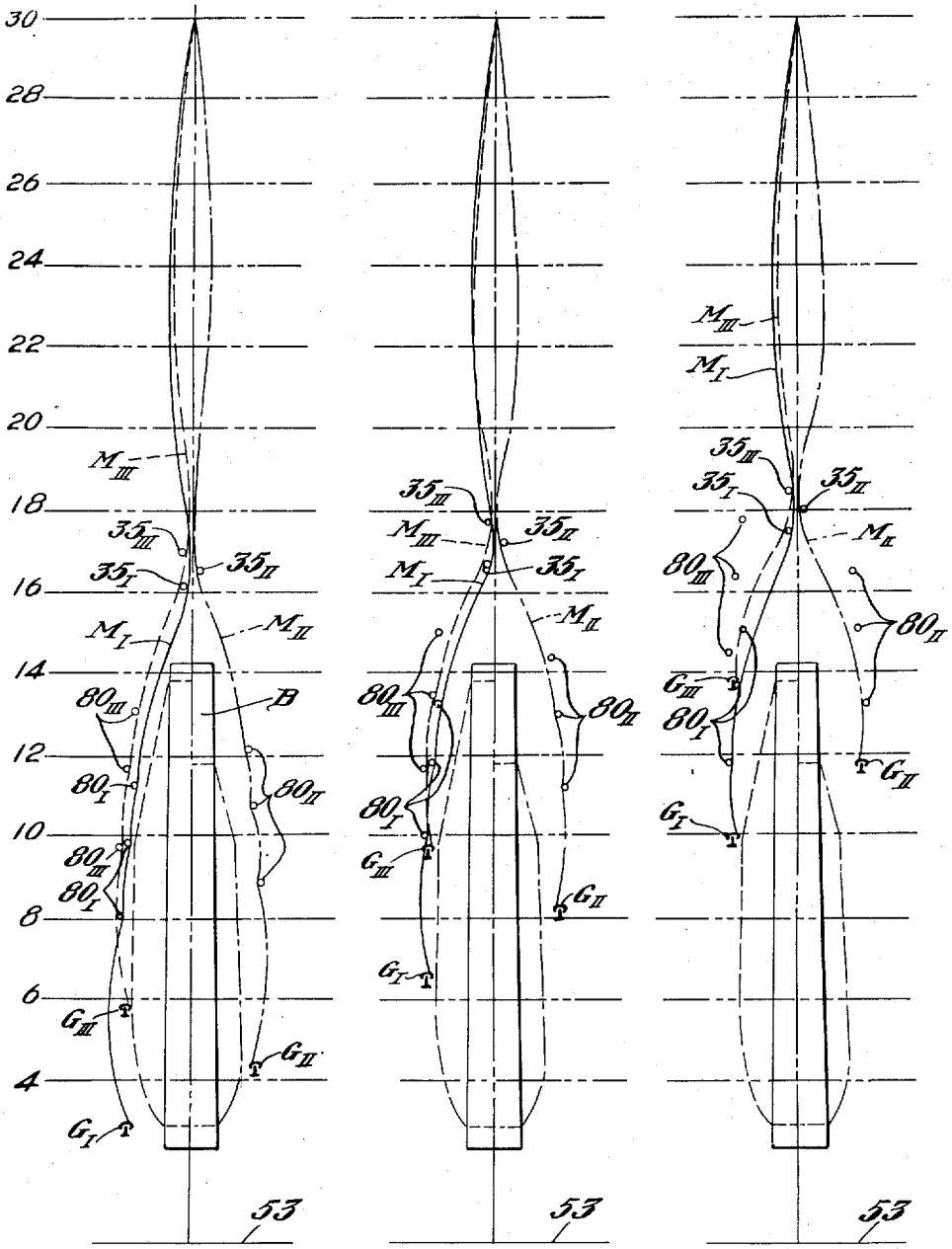

[The arrangement in Figs. 13A to 13C, though it facilitates use of a ring 35 of small diameter, causes the figure of revolution to bow outwardly somewhat more than is necessary or desirable at certain stages, such for example as shown in the curve $M_{II}$ of Fig. 13B. This may easily be corrected by adding between the ring 35 and the spinning ring, one or more additional smooth, polished rings 80 which confine the lower part of the figure of revolution and stabilize the angle of approach of the thread to the traveler. Figs. 14A to 14C show the use of one such ring 80. Figs. 15A to 15C show a machine and process which is generally similar to that shown in Figs. 14A to 14C but includes the use of three such rings 80 and a greater stabilization of angle of approach of the thread to the traveler.]

Figure 7:
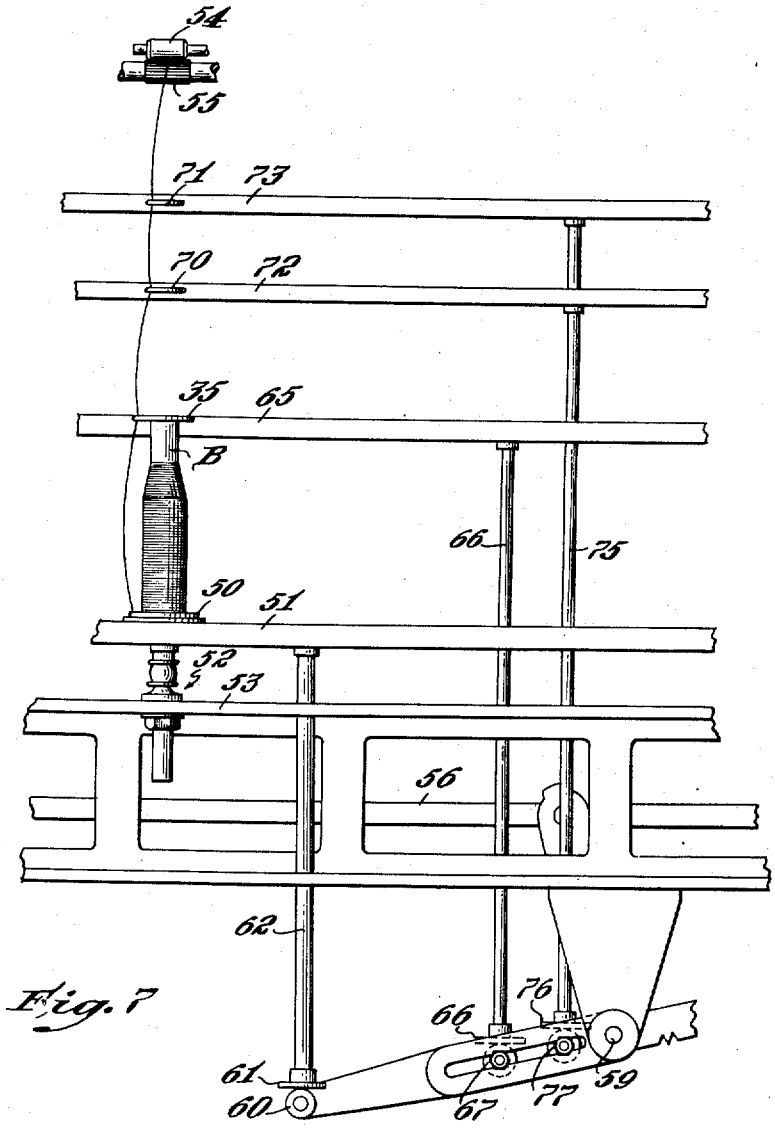

The ring [, or rings,] 80 is [or are] given an up and down motion by lifting and lowering mechanism such as employed in Fig. 7, in harmony with the ring rail but only a fractional part thereof, for example about 60% of the motion of the spinning ring.

*The ring 80 stabilizes the angle of approach of the thread to the traveler as will be seen from Figs. 13A to 13C. Instead of the ring 80 of Figs. 13A to 13C, a plurality of rings 80 having the same up and down motion can be employed.*

*Figs. 14A to 14C show a machine and process which is generally similar to that shown in Figs. 13A to 13C but includes the use of three such rings 80 and a greater stabilization of angle of approach of the thread to the traveler.*

As the distance between the spinning ring and ring 35 shortens in the upper positions of the spinning ring, the outward bowing tendency of the stabilized figure of revolution diminishes, and the ring 80, or one or more of the several rings 80, may cease contact with the figure of revolution as shown in Figs. [14C and 15C] *13C and 14C*.

The package produced by the arrangement of Figs. [15A to 15C] *14A to 14C* holds approximately 16 ounces of thread, or more than double the amount of thread of the usual package of No. 20's as ordinarily produced by conventional procedures.

Tests of the traveler life in the device of Figs. [15A to 15C] *14A to 14C* have been made in which a group of spindles operating as shown in these figures have been run 1,000 hours in spinning of No. 20's yarn at 9,000 R. P. M., without a single failure of a traveler. Ordinarily in conventional spinning, the travelers need to be changed about [avery] *every* 160 hours or objectionable breakage of the travelers and/or unduly high tension in the yarn will follow.

As indicated above, the attempted naturally-necked figure of revolution of Figs. 12A to 12C did not run satisfactorily and there was very frequent breakage of the thread. As compared to this, the device of Figs. [15A to 15C] *14A to 14C* has been successfully operated in the spinning of 20's carded cotton yarn at a spindle speed of 9,000 R. P. M. with only from 4 to 6 breakages of thread per 1,000 spindle hours. The same roving, spun in a conventional manner with 2 inch spinning rings will for example involve 30 to 40 breakages of the yarn per 1,000 spindle hours. This infrequency of thread breakage indicates that the invention improves uniformity of tension, avoiding such fluctuations as are liable to break the thread at the inevitably occurring thin places.

[Comparative tests of the tension of the spinning thread have been made in order to study the effect of a ring and rings upon the tension in the natural figure of revolution. These tests involved first the apparatus of Figs. 12A to 12C, then the same apparatus with a ring 35 added, as shown in Figs. 13A to 13C, then this apparatus with the further addition of a single ring 80, as shown in Figs. 14A to 14C, and finally the same apparatus with the addition of two further rings 80 similarly to the apparatus shown in Figs. 15A to 15C. Each arrangement of the apparatus was operated at a number of levels of the generator (traveler) in the winding upon an empty bobbin, a half full bobbin and a full bobbin, and the tension was recorded in grams. The yarn was number 20's, the spindle speed was 9,000 R. P. M. and the front roll speed corresponded to 21.9 turns per inch at 9,000 R. P. M. spindle speed.]

[The tension measurements were made with a hand tensometer clamped approximately two inches below the front roll corresponding to roll 55 of Fig. 7, and the pulleys of the tensometer were engaged with the spinning yarn. This, in effect, lowered the apex point of the figure of revolution about two inches so that the figures of revolution in the tests were all about two inches shorter than shown in Figs. 12A to 12C.]

[If simple roving had been delivered by the front rolls in these tension tests, the tensometer pulleys would have prevented the twist from running any higher than these pulleys and the untwisted yarn above them would have been broken by the tension. Accordingly, instead of untwisted roving, a special yarn of 20's count and having a left-hand twist of 43.8 turns per inch was fed through the front rolls. The right-hand twisting action of the traveler then imparted a right-hand twist of 21.9 turns per inch, that is, removed one-half of the left-hand twist, leaving a final wound yarn having 21.9 turns of left-hand twist per inch. Thus it was assured that the yarn above the tensometer pulleys would not be weakened by the twist-blocking action of the tensometer pulleys, and that, at the same time, the yarn below the pulleys would have a count of 20's and a typical degree of twist.]

[The results of these tests, together with the calculated maximum variation in tension for each arrangement, are shown in the following table:]

TENSION TESTS SHOWING EFFECTS OF THE SEVERAL RINGS UPON THE TENSION AT THE APEX (Tensions given in grams)

| Generator Level (Figures refer to inches above spindle rail) | No rings—Figs. 12A–12C | | | Rings 35—Figs. 13A–13C | | | Ring 35 and Single Ring 80—Figs. 14A–14C | | | Ring 35 and 3 Rings 80, Similar to Figs. 15A–15C | | |
|---|---|---|---|---|---|---|---|---|---|---|---|---|
| | Empty | Half-Full | Full | Empty | Half-Full | Full | Empty | Half-Full | Full | Empty | Half-Full | Full |
| Top | | | 53 | | | 29 | | | 29 | | | 28 |
| 12 | | 55 | 36 | | 25 | 21 | | 25 | 21 | | 25 | 21 |
| 10 | 70 | 36 | 33 | 32 | 22 | 20 | 31 | 23 | 20 | 32 | 22 | 20 |
| 8 | 80 | 21 | 18 | 32 | 23 | 21 | 32 | 23 | 20 | 32 | 22 | 21 |
| 6 | 32 | 21 | | 35 | 25 | | 33 | 24 | | 33 | 22 | |
| 4 | 31 | | | 38 | | | 34 | | | 32 | | |
| Bot | 32 | | | 41 | | | 35 | | | 33 | | |
| | Maximum Variation Approximately 350% | | | Maximum Variation Approximately 105% | | | Maximum Variation Approximately 75% | | | Maximum Variation Approximately 65% | | |

[As might be expected from the excessive breakage encountered in attempting to use the natural necked figure of revolution of Figs. 12A to 12C, the tension tests show that excessive tensions were present at certain stages of the natural necked figure of revolution, a maximum variation in tension of approximately 350% being found.]

The equalization of tension as brought about by the present invention not only appears to reduce yarn breakage but also appears to contribute to the increase in the usable life of the travelers.

[In a typical well run conventional spinning operation with materially smaller rings and materially shorter traverse than used in these tension tests, thirty to forty breakages of the yarn were encountered per 1,000 spindle hours, and a variation of approximately 200% in tension occurred during the winding of the bobbins. Obviously any increase in this variation would be extremely undesirable.]

[The tension variations of approximately 105%, 75% and 65% secured with the several arrangements of rings as set forth in the above table are all materially lower than the typical 200% variation which may be expected in conventional operations in winding materially smaller packages than involved in the above tension tests. As shown by the above table, the single ring 35 yielded a substantial improvement, and the addition of one ring 80 and three rings 80 afforded still further equalization of tension.]

The figure of revolution has been described above as generated by a traveler running around a spinning ring at the base of the figure of revolution, and the traveler has been referred to as the generator. Other forms of generators, such as fliers, rotating caps, and the like, can be employed to generate the figure of revolution and define its base.

The invention has been described in its application to machines of the type in which the generator is traversed and the winding bobbin is not traversed but remains at a constant level, because this type of machine is in most common use and is in many respects simpler than machines in which the winding bobbin is traversed. The invention is likewise applicable to this latter type of machine. Traversing the winding bobbin instead of the spinning ring and traveler has the advantage of maintaining the figure of revolution of uniform length, and when this is done the [ring or] rings employed to stabilize and modify the figure of revolution may advantageously be held stationary during the spinning operation and lifting and lowering mechanism therefor may be omitted.

[The present specification explains the invention generally and also illustrates different emmodiments thereof, and in these illustrated embodiments the thread is conveyed from the apex to the generator and wound up into a package enveloped by the figure of revolution. A further embodiment of the invention in which the thread is unwound from a package which is enveloped by the figure of revolution and is then conveyed from a generator to the apex, as in two-for-one uptwisting, is described and illustrated in my patent specification, Serial No. 724,988, for Twisting, filed simultaneously, which may be referred to for details of that embodiment.]

In the specification and claims the terms "thread" and "yarn" are used in a broad sense to include either a strand that has already received a substantial amount of twist or an untwisted strand that is receiving its initial twist in the present operation. A "twisting machine" is intended to include a machine that performs a twisting operation even though the machine may be referred to in the industry as a spinning machine.

I claim:

[1. Method of twisting a thread in which the conventional arrangement of the twisting thread is altered by an increase in the length of the figure of revolution between a circularly-moving generator and an apex sufficient so that such figure tends to assume an outwardly concave necked configuration if allowed to follow its natural course between said apex and generator, and a naturally outwardly-concave portion of the figure so formed is stabilized in an outwardly-convex outline by causing the figure to react against encircling confining force between said portion and the apex.]

[2. Method of twisting a thread in which the conventional arrangement of the twisting thread is altered by an increase in the length of the figure of revolution between a circularly-moving generator and an apex sufficient so that such figure tends to assume an outwardly concave necked configuration if allowed to follow its natural course between said apex and generator, and a naturally outwardly-concave portion of the figure so formed is stabilized in an outwardly-convex outline by causing the figure to react against encircling confining force between said portion and a level in the general region of the uppermost natural enlargement of the figure.]

[3. Method of twisting a thread in which the conventional arrangement of the twisting thread is altered by an increase in the length of the figure of revolution between a circularly-moving generator and an apex sufficient so that such figure tends to assume an outwardly concave necked configuration if allowed to follow its natural course between said apex and generator, a package of the thread being supported at least partially within the figure of revolution of the thread, and a naturally outwardly-concave portion of the figure so formed is stabilized in an outwardly-convex outline in the region of the package by causing the figure to react against encircling confining force between said portion and the apex.]

[4. Method of twisting a thread and distributing the thread onto a package by a circularly-moving generator, in which the conventional arrangement of the twisting thread is altered by an increase in the length of the figure of revolution between the generator and an apex sufficient so that such figure tends to assume an outwardly concave necked configuration substantially throughout winding of the full-diameter portions of the package if allowed to follow its natural course between said apex and generator, and a naturally outwardly-concave portion of the figure so formed is stabilized in an outwardly-convex outline in the region of the package by causing the figure to react against encircling confining force between said portion and the apex.]

[5. Method of twisting thread being wound onto a package comprising distributing the thread onto the winding package by a circularly-moving generator around which the thread makes an open bend, the generator having a diameter of at least 2¼ inches, establishing, between said generator and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[6. Method of twisting thread being wound onto a package comprising distributing the thread onto the winding package by a circularly-moving generator around which the thread makes an open bend, the generator having a traversing movement of at least 9 inches, establishing, between said generator and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[7. Method of twisting thread being wound onto a package comprising distributing the thread onto the winding package by a circularly-moving generator around which the thread makes an open bend, the generator having a diameter of at least 2¼ inches and a traversing movement of at least 9 inches, establishing, between said generator and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[8. Method of twisting a thread being wound onto a package comprising distributing the thread onto the winding package by a circularly-moving ring traveler around which the thread makes an open bend, the traveler having a circular path of at least 2¼ inches diameter, establishing, between said traveler and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[9. Method of twisting a thread being wound onto a package comprising distributing the thread onto the winding package by a circularly-moving ring traveler around which the thread makes an open bend, the traveler having a traversing movement of at least 9 inches, establishing, between said traveler and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[10. Method of twisting a thread being wound onto a package comprising distributing the thread onto the winding package by a circularly-moving ring traveler around which the thread makes an open bend, the traveler having a circular path of at least 2¼ inches diameter and a traversing movement of at least 9 inches, establishing, between said traveler and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[11. Method of twisting a thread of a count of 20's or finer being wound onto a package comprising distributing the thread onto the winding package by a circularly-moving ring traveler around which the thread makes an open bend, the traveler having a circular path of at least 2¼ inches diameter, a linear speed of at least a mile per minute and a traversing movement of at least 9 inches, establishing, between said traveler and an apex, a figure of revolution of the thread of sufficient length to assume substantially throughout winding of the full-diameter portions of the package an outwardly-concave necked configuration if allowed to follow its natural course between said apex and generator, and stabilizing a portion of the figure in an outwardly-convex outline in the region of the package by causing the figure to react against an encircling element between said portion and the apex.]

[12. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, in combination with an encircling element contacting with the figure of revolution to stabilize a naturally outwardly concave portion thereof in an outwardly-convex outline between said element and generator.]

[13. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, in combination with an encircling element contacting with the figure of revolution between a naturally concave portion thereof and a level in the general region of the uppermost natural enlargement of the figure to stabilize said naturally outwardly-concave portion thereof in an outwardly-convex outline.]

[14. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, in combination with an encircling element contacting with the figure of revolution in the region of natural formation of a neck therein to stabilize a naturally outwardly-concave portion thereof in an outwardly-convex outline between said element and generator.]

[15. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, means for supporting a package of the thread at least partially within the figure of revolution, in combination with an encircling element contacting with the figure of revolution to stabilize a portion of the figure in an outwardly-convex outline in the region of the package.]

[16. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex.]

[17. A twisting machine comprising a circularly-moving generator around which the thread is adapted to be threaded in an open bend, means for supporting a rotating winding package within the path of said generator, the generator being arranged to distribute the thread on the winding package and having a path of at least 2¼ inches diameter, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex.]

[18. A twisting machine comprising a circularly-moving generator around which the thread is adapted to be threaded in an open bend, means for supporting a rotating winding package within the path of said generator, the generator being arranged to distribute the thread on the winding package and having a traversing movement of at least 9 inches, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex.]

[19. A twisting machine comprising a circularly-moving generator around which the thread is adapted to be threaded in an open bend, means for supporting a rotating winding package within the path of said generator, the generator being arranged to distribute the thread on the winding package and having a path of at least 2¼ inches diameter and a traversing movement of at least 9 inches, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex.]

[20. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex.]

[21. A twisting machine comprising a ring for a circularly-moving ring traveler, around which traveler the thread is adapted to be threaded in an open bend, means for supporting a rotating winding thread package within the path of said traveler to receive thread therefrom, the traveler having a traversing movement of at least 9 inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex.]

[22. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter and a traversing movement of at least 9 inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex.]

*23. Method of twisting a thread in which the conventional arrangement of the twisting thread is altered by an increase in the length of the figure of revolution between a circularly-moving generator and an apex sufficient so that, with the*

*thread threaded around the generator in an open bend, such figure assumes an outwardly concave necked configuration if allowed to follow its natural course between said apex and generator, and a naturally outwardly-concave portion of the figure so formed is stabilized in an outwardly-convex outline by causing the figure to react against an encircling element applying confining force at a given level between said portion and the apex and, simultaneously, to react against an encircling element at a substantially different level.*

*24. Method of twisting a thread in which the conventional arrangement of the twisting thread is altered by an increase in the length of the figure of revolution between a circularly-moving generator and an apex sufficient so that, with the thread threaded around the generator in an open bend, such figure assumes an outwardly concave necked configuration if allowed to follow its natural course between said apex and generator, and a naturally outwardly-concave portion of the figure so formed is stabilized in an outwardly-convex outline by causing the figure to react against an encircling element applying confining force between said portion and the apex and, simultaneously, to react against an encircling element applying confining force at a substantial distance above the first-named encircling element and at a substantial distance below the apex thereby tending to maintain the figure of revolution sufficiently large at the first-named encircling element as to run in contact therewith.*

*25. Method of twisting a thread in which the conventional arrangement of the twisting thread is altered by an increase in the length of the figure of revolution between a circularly-moving generator and an apex sufficient so that, with the thread threaded around the generator in an open bend, such figure assumes an outwardly concave necked configuration if allowed to follow its natural course between said apex and generator, and a naturally outwardly-concave portion of the figure so formed is stabilized in an outwardly-convex outline by causing the figure to react against an encircling element applying confining force between said portion and the apex and, simultaneously, to react against an encircling element nearer to the generator than the first-named encircling element and acting to stabilize the angle of approach of the thread to the generator.*

*26. Method of twisting a thread and distributing the thread onto a rotating winding package by a circularly-moving generator within whose path the package is supported, in which the conventional arrangement of the twisting thread is altered by an increase in the length of the figure of revolution between the generator and an apex sufficient so that, with the thread threaded around the generator in an open bend, such figure assumes an outwardly concave necked configuration substantially throughout winding of the full-diameter portions of the package if allowed to follow its natural course between said apex and generator, and a naturally outwardly-concave portion of the figure so formed is stabilized in an outwardly-convex outline in the region of the package by causing the figure to react against encircling confining force between said portion and the apex, the thread of the figure of revolution being in contact with encircling means at a plurality of substantially different levels simultaneously, including contact with an encircling element between said portion and the apex.*

*27. Method of twisting a thread and distributing the thread onto a rotating winding package by a circularly-moving generator within whose path the package is supported, in which the conventional arrangement of the twisting thread is altered by an increase in the length of the figure of revolution between the generator and an apex sufficient so that, with the thread threaded around the generator in an open bend, such figure assumes an outwardly concave necked configuration substantially throughout winding of the full-diameter portions of the package if allowed to follow its natural course between said apex and generator, and a naturally outwardly-concave portion of the figure so formed is stabilized in an outwardly-convex outline in the region of the package by causing the figure to react against encircling confining force between said portion and the apex, said encircling confining force being applied by an encircling element greater in diameter than the fully wound package and below the top of the bobbin for the winding package during at least a portion of the cycle, and the thread of the figure of revolution being caused to contact with a further encircling element of materially smaller diameter than the first-named encircling element and spaced above said first-named encircling element and above the bobbin.*

*28. Method of twisting a thread and distributing the thread onto a rotating winding package by a circularly-moving generator within whose path the package is supported, in which the conventional arrangement of the twisting thread is altered by an increase in the length of the figure of revolution between the generator and an apex sufficient so that, with the thread threaded around the generator in an open bend, such figure assumes an outwardly concave necked configuration substantially throughout winding of the full-diameter portions of the package if allowed to follow its natural course between said apex and generator, and a naturally outwardly-concave portion of the figure so formed is stabilized in an outwardly-convex outline in the region of the package by causing the figure to react against encircling confining force between said portion and the apex, said encircling confining force being applied by an encircling element contacting with the thread of the figure of revolution between said portion and the apex and leaving the figure of revolution free to bulge outwardly in the region between said encircling element and the apex, and the thread of the figure of revolution also being caused to contact with at least one other encircling element nearer to the generator than the aforesaid encircling element.*

*29. Method of twisting a thread being wound onto a package comprising distributing the thread onto the winding package by a circularly-moving ring traveler around which the thread makes an open bend, the winding package being supported within the path of the generator, the traveler having a circular path of at least 2¼ inches diameter and a traversing movement of at least 9 inches, establishing, between said traveler and an apex, a figure of revolution of the thread of sufficient length to assume substantially throughout winding of the full-diameter portions of the package an outwardly-concave necked configuration, if allowed to follow its natural course between said apex and generator, and stabilizing a portion of the figure in an outwardly-convex out-*

*line in the region of the package by causing the figure to react against encircling means at a plurality of substantially different levels simultaneously, including contact with an encircling element between said portion and the apex.*

*30. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, in combination with encircling structure applying contact to the figure of revolution at a plurality of substantially different levels simultaneously, said structure including an encircling element contacting with the figure of revolution to stabilize a naturally outwardly-concave portion thereof in an outwardly-convex outline between said element and generator.*

*31. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, in combination with encircling structure applying contact to the figure of revolution at a plurality of substantially different levels simultaneously, said structure including an encircling element contacting with the figure of revolution between a naturally concave portion thereof and a level in the general region of the uppermost natural enlargement of the figure to stabilize said naturally outwardly-concave portion thereof in an outwardly-convex outline.*

*32. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, in combination with encircling structure applying contact to the figure of revolution at a plurality of substantially different levels simultaneously, said structure including an encircling element contacting with the figure of revolution in the region of natural formation of a neck therein to stabilize a naturally outwardly-concave portion thereof in an outwardly-convex outline between said element and generator.*

*33. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, means for supporting a package of the thread at least partially within the figure of revolution, in combination with encircling structure applying contact to the figure of revolution at a plurality of substantially different levels simultaneously, said structure including an encircling element contacting with the figure of revolution to stabilize a portion of the figure in an outwardly-convex outline in the region of the package.*

*34. A twisting machine comprising a circularly-moving ring traveler around which the thread is adapted to be threaded in an open bend, and means defining an apex, said apex-defining means and said traveler cooperating to form between them a figure of revolution of the thread of sufficient length to assume an outwardly-concave necked configuration if allowed to follow its natural course between said apex and traveler with the thread so threaded, means for supporting a package of the thread at least partially within the figure of revolution, in combination with encircling structure applying contact to the figure of revolution at a plurality of substantially different levels simultaneously, said structure including an encircling element contacting with the figure of revolution to stabilize a portion of the figure in an outwardly-convex outline in the region of the package, the traveler having a circular path of at least 2¼ inches and there being a relative traversing movement of at least 9 inches between the traveler and the winding package.*

*35. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, means for supporting a package of the thread at least partially within the figure of revolution, in combination with encircling structure applying contact to the figure of revolution at a plurality of substantially different levels simultaneously, said structure including an encircling element contacting with the figure of revolution to stabilize it so that the portion of the figure between said element and generator is maintained in an outwardly-convex outline in the region of the package and an outwardly-concave necked configuration between said element and generator is prevented.*

*36. A twisting machine comprising a circularly-moving generator around which the thread is adapted to be threaded in an open bend, and means defining an apex, said apex-defining means and said generator cooperating to form between them a figure of revolution of the thread of sufficient length to assume an outwardly-concave necked configuration if allowed to follow its natural course between said apex and generator with the thread so threaded, means for supporting a package of the thread at least partially within the figure of revolution, in combination with encircling structure applying contact to the figure of revolution at a plurality of substantially different levels simultaneously, said structure including an encircling element contacting with the figure of revolution to stabilize it so that the portion of the figure between two such levels of contact is maintained in an outwardly-convex outline in the region of the package and an outwardly concave necked configuration between such two levels is prevented.*

*37. A twisting machine comprising a circularly-moving generator around which the thread is adapted to be threaded in an open bend, means for supporting a rotating winding package within*

*the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means constructed and arranged to apply encircling contact to the figure of revolution at a plurality of substantially different levels simultaneously for stabilizing a portion of the figure in an outwardly-convex outline in the region of the package, said stabilizing means comprising an encircling element contacting with the figure of revolution between said portion and the apex.*

*38. A twisting machine comprising a circularly-moving ring traveler around which the thread is adapted to be threaded in an open bend, means for supporting a rotating winding package within the path of said traveler, the traveler being arranged to distribute the thread on the winding package, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means constructed and arranged to apply encircling contact to the figure of revolution at a plurality of substantially different levels simultaneously for stabilizing a portion of the figure in an outwardly-convex outline in the region of the package, said stabilizing means comprising an encircling element contacting with the figure of revolution between said portion and the apex, the traveler having a circular path of at least 2¼ inches diameter and there being a relative traversing movement of at least 9 inches between the traveler and the package.*

*39. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means constructed and arranged to apply encircling contact to the figure of revolution at a plurality of substantially different levels simultaneously for stabilizing a portion of the figure in an outwardly-convex outline in the region of the package, said stabilizing means comprising an encircling element contacting with the figure of revolution between said portion and the apex, the lowermost such encircling contact being at a larger diameter than the upper most such encircling contact.*

*40. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means constructed and arranged to apply encircling contact to the figure of revolution at a plurality of substantially different levels simultaneously for stabilizing a portion of the figure in an outwardly-convex outline in the region of the package, said stabilizing means comprising an encircling element contacting with the figure of revolution between said portion and the apex, the lowermost such encircling contact being at a diameter larger than that of the empty bobbin for the winding package.*

*41. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex and a further encircling element contacting the figure of revolution at a substantial distance above the first-named encircling element and at a substantial distance below the apex thereby tending to maintain the figure of revolution sufficiently large at the first-named encircling element as to run in contact therewith.*

*42. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex and a further encircling element presenting a smaller internal diameter to the figure of revolution than the first-named encircling element and contacting the figure of revolution at a substantial distance above the first-named encircling element and at a substantial distance below the apex so as to tend to* maintain the figure of revolution sufficiently large at the first-named encircling element as to run in contact therewith, the first-named encircling element being sufficiently near to the generator path so that between the first-named encircling element and the generator the figure of revolution is everywhere outwardly-convex.

43. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex and a further encircling element of materially smaller internal diameter than the first-named encircling element and spaced above said first-named encircling element and above the bobbin for the winding package, said first-named encircling element being greater in diameter than the fully wound package and being below the top of the bobbin during at least a portion of the cycle.

44. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex, said encircling element being greater in diameter than the empty bobbin for the winding package and being below the top of said bobbin during at least a portion of the cycle, and a further encircling element engaging the figure of revolution between the first-named encircling element and the apex, said further encircling element being arranged to leave the figure of revolution free to bulge outwardly in the region between said further encircling means and the apex.

45. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex and at least one other encircling element nearer to the generator than the aforesaid encircling element and acting to stabilize the angle of approach of the thread to the generator.

46. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex and at least one other encircling element nearer to the generator than the aforesaid encircling element and acting to stabilize the angle of approach of the thread to the generator, said nearer encircling element being of larger internal diameter than the first-mentioned encircling element.

47. A twisting machine comprising a circularly-moving generator around which the thread is adapted to be threaded in an open bend, means for supporting a rotating winding package within the path of said generator, the generator being arranged to distribute the thread on the winding package, means defining an apex, said apex-defining means and said generator cooperating to form between them a figure of revolution of the thread of sufficient length to assume substantially throughout winding of the full diameter portions of the package an outwardly-concave necked configuration if allowed to follow its natural course between said apex and generator with the thread so threaded, and means for stabilizing a portion of the figure in an outwardly-convex outline in the region of the package, said stabilizing means comprising an encircling element contacting with the figure of revolution between said portion and the apex and arranged to leave the figure of revolution free to bulge outwardly in the region between said encircling element and the apex, and at least one other encircling element nearer to the generator than the aforesaid encircling element.

48. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter and a traversing movement of at least 9

*inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means constructed and arranged to apply encircling contact to the figure of revolution at a plurality of substantially different levels simultaneously for stabilizing a portion of the figure in an outwardly-convex outline in the region of the package, said stabilizing means comprising an encircling element contacting with the figure of revolution between said portion and the apex, the lowermost such level of application of such encircling contact being below the top of the bobbin for the winding package at least at times during the cycle of winding the package.*

*49. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter and a traversing movement of at least 9 inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex and a further encircling element presenting a smaller internal diameter to the figure of revolution than the first-named encircling element and contacting the figure of revolution at a substantial distance above the first-named encircling element and at a substantial distance below the apex so as to tend to maintain the figure of revolution sufficiently large at the first-named encircling element as to run in contact therewith, the first-named encircling element being below the top of the bobbin for the winding package at least at times during the cycle of winding the package.*

*50. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter and a traversing movement of at least 9 inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex and a further encircling element presenting a smaller internal diameter to the figure of revolution than the first-named encircling element and contacting the figure of revolution at a substantial distance above the first-named encircling element and at a substantial distance below the apex so as to tend to maintain the figure of revolution sufficiently large at the first-named encircling element as to run in contact therewith, the second-named encircling element being sufficiently far from the traveler path, at times at least during the cycle, so that in the absence of the first-named encircling element the figure of revolution of the thread between the traveler and the second-named encircling element would form a neck at times at least during the cycle.*

*51. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter and a traversing movement of at least 9 inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex and at least one other encircling element nearer to the traveler than the aforesaid encircling element and acting to stabilize the angle of approach of the thread to the traveler, said nearer encircling element being substantially below the top of the bobbin for the package at least during winding of lower portions of the package.*

*52. A twisting machine comprising a ring for a circularly-moving ring traveler, around which traveler the thread is adapted to be threaded in an open bend, means for supporting a rotating winding thread package within the path of said traveler to receive thread therefrom, the traveler having a path of at least 2¼ inches diameter and a traversing movement of at least 9 inches, means defining an apex, said apex-defining means and said traveler cooperating to form between them a figure of revolution of the thread of sufficient length to assume substantially throughout winding of the full diameter portions of the package an outwardly-concave necked configuration if allowed to follow its natural course between said apex and traveler with the thread so threaded, and means for stabilizing a portion of the figure in an outwardly-convex outline in the region of the package, said stabilizing means comprising an encircling element contacting with the figure of revolution between said portion and the apex and at least one other encircling element nearer to the traveler than the aforesaid encircling element and acting to stabilize the angle of approach of the thread to the traveler, said nearer encircling element having an internal diameter at least as large as a substan-*

*tial proportion of the diameter of the traveler path.*

SACO-LOWELL SHOPS,
*Assignee of Eugene C. Gwaltney, Deceased.*
By MALCOLM D. SHAFFNER,
*Vice President and Treasurer.*

REFERENCES CITED

The following references are of record in the file of this patent or the original file:

UNITED STATES PATENTS

| Number | Name | Date |
|---|---|---|
| Re. 23,232 | McCann | May 23, 1950 |
| Re. 23,281 | Giffin | Oct. 10, 1950 |
| Re. 23,402 | Mulholland | Aug. 28, 1951 |
| 456,249 | Franke | July 21, 1891 |
| 819,496 | Allgood | May 1, 1906 |
| 949,733 | O'Connell | Feb. 15, 1910 |
| 2,081,416 | Vicq | May 25, 1937 |
| 2,386,704 | McLellan | Oct. 9, 1945 |

FOREIGN PATENTS

| Number | Country | Date |
|---|---|---|
| 9,728 | Great Britain | of 1884 |
| 13,269 | Great Britain | of 1905 |
| 161,542 | Switzerland | July 17, 1933 |